US011130077B2

(12) United States Patent
Hindman et al.

(10) Patent No.: US 11,130,077 B2
(45) Date of Patent: Sep. 28, 2021

(54) COMPOSITE LOOP CHAIN

(71) Applicant: Evoqua Water Technologies LLC, Pittsburgh, PA (US)

(72) Inventors: Donald W. Hindman, Menomonee, WI (US); Krishna Kamath, Billerica, MA (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 99 days.

(21) Appl. No.: 16/493,932

(22) PCT Filed: Mar. 13, 2018

(86) PCT No.: PCT/US2018/022118
§ 371 (c)(1),
(2) Date: Sep. 13, 2019

(87) PCT Pub. No.: WO2018/169920
PCT Pub. Date: Sep. 20, 2018

(65) Prior Publication Data
US 2020/0384385 A1 Dec. 10, 2020

Related U.S. Application Data

(60) Provisional application No. 62/471,013, filed on Mar. 14, 2017.

(51) Int. Cl.
*B01D 21/20* (2006.01)
*F16G 13/06* (2006.01)
(Continued)

(52) U.S. Cl.
CPC ......... *B01D 21/20* (2013.01); *B01D 21/2455* (2013.01); *F16G 13/06* (2013.01); *C02F 11/00* (2013.01); *C02F 2201/002* (2013.01)

(58) Field of Classification Search
CPC ........ B01D 21/04; B01D 21/18; B01D 21/20; B01D 21/22; B01D 21/2455; F16G 13/02; F16G 13/06; F16G 13/07
(Continued)

(56) References Cited

U.S. PATENT DOCUMENTS

| 1,566,410 A | 12/1925 | Lomando |
| 2,061,223 A | 11/1936 | Cunningham et al. |

(Continued)

FOREIGN PATENT DOCUMENTS

| CN | 202743879 U | 2/2013 |
| DE | 20211954 U1 | 1/2003 |

(Continued)

OTHER PUBLICATIONS

Young, Lee. W., "Written Opinion of the International Searching Authority", International Application No. PCT/US2018/022118, dated Jun. 1, 2018, 5 pages.

(Continued)

*Primary Examiner* — Christopher Upton

(57) ABSTRACT

A settling basin of a wastewater treatment system includes a collector chain including chain links having a plurality of side bars, stepped connecting pins configured to join the plurality of side bars and including a first end including a head portion having a cross-sectional area larger than portions of the plurality of side bars through which the stepped connecting pin extends, end caps configured to receive second ends of the stepped connecting pins, and apertures defined in the end caps and second ends of the stepped connecting pins configured to receive a retaining element that holds the end caps in position on the second ends of the stepped connecting pins.

23 Claims, 18 Drawing Sheets

(51) Int. Cl.
*B01D 21/24* (2006.01)
*C02F 11/00* (2006.01)

(58) Field of Classification Search
USPC ........ 210/526, 803; 474/206, 207, 223, 227, 474/228, 234; 59/85
See application file for complete search history.

(56) References Cited

U.S. PATENT DOCUMENTS

| | | | |
|---|---|---|---|
| 4,050,323 | A | 9/1977 | I'Anson |
| 4,863,418 | A | 9/1989 | Fillar et al. |
| 4,950,398 | A | 8/1990 | Wiegand et al. |
| 5,215,616 | A | 6/1993 | Fillar |
| 5,460,727 | A * | 10/1995 | Davis ............... B01D 21/18 210/526 |
| 8,631,636 | B2 * | 1/2014 | Khrakovsky ........... F16G 15/06 59/85 |
| 2006/0283168 | A1 * | 12/2006 | Humcke ................ F16G 13/07 59/85 |
| 2008/0214344 | A1 * | 9/2008 | Lodge ................ G01L 5/047 474/207 |
| 2014/0141913 | A1 * | 5/2014 | Yokoyama ............ F16G 13/06 474/206 |

FOREIGN PATENT DOCUMENTS

| | | |
|---|---|---|
| JP | S547043 A | 1/1979 |
| KR | 20140027770 A | 3/2014 |
| KR | 20160001424 U | 5/2016 |
| WO | 2009/044117 A1 | 4/2009 |

OTHER PUBLICATIONS

Young, Lee. W., "International Search Report", International Application No. PCT/US2018/022118, dated Jun. 1, 2018, 2 pages.

Wittmann-Regis, Agnes, "International Preliminary Report on Patentability", International Application No. PCT/US2018/022118, dated Sep. 17, 2019, 6 pages.

Unknown, "First Office Action", Chinese Patent Application 201880017800.0, dated Oct. 21, 2020, 14 pages.

Simens, Mark Phil, "Extended European Search Report", European Patent Application No. 18768738.9, dated Dec. 8, 2020, 7 pages.

Unknown, "Communication pursuant to Rules 70(2) and 70a(2) EPC", European Patent Application No. 18768738.9, dated Jan. 12, 2021, 1 page.

* cited by examiner

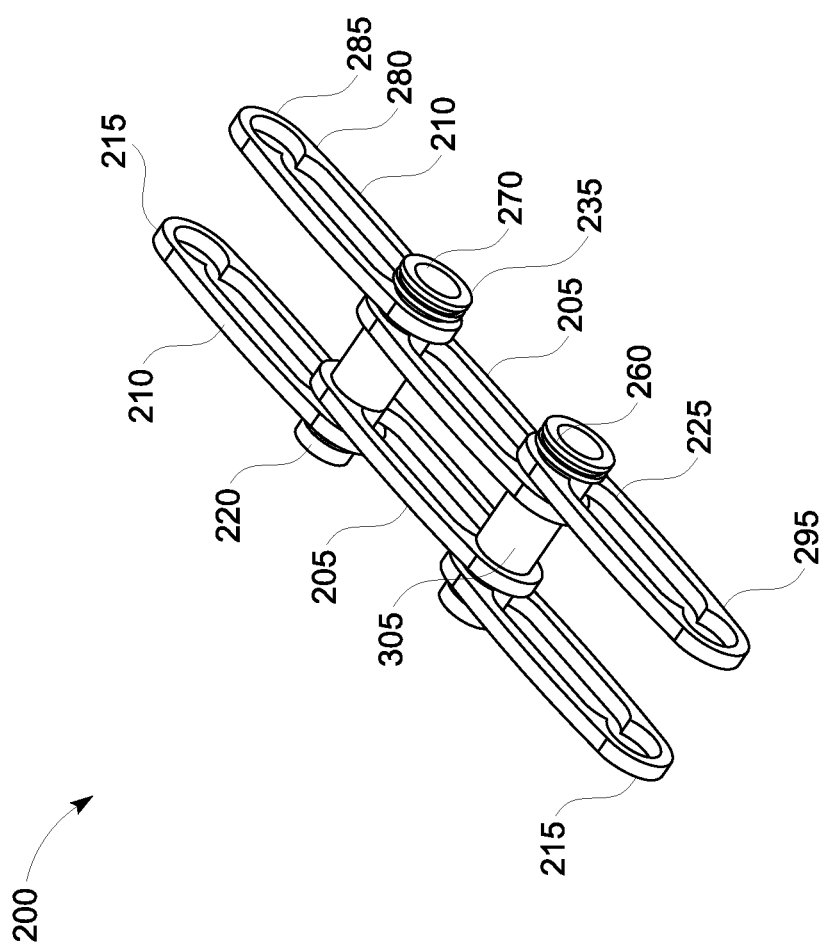

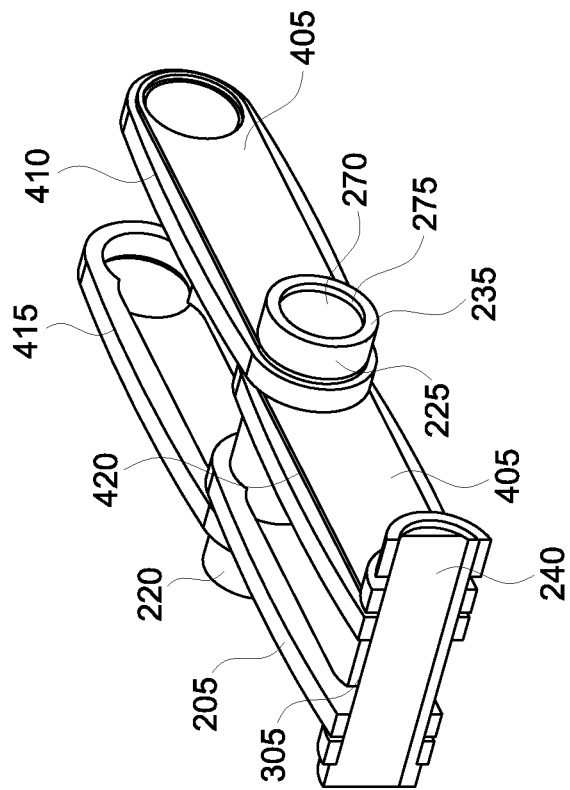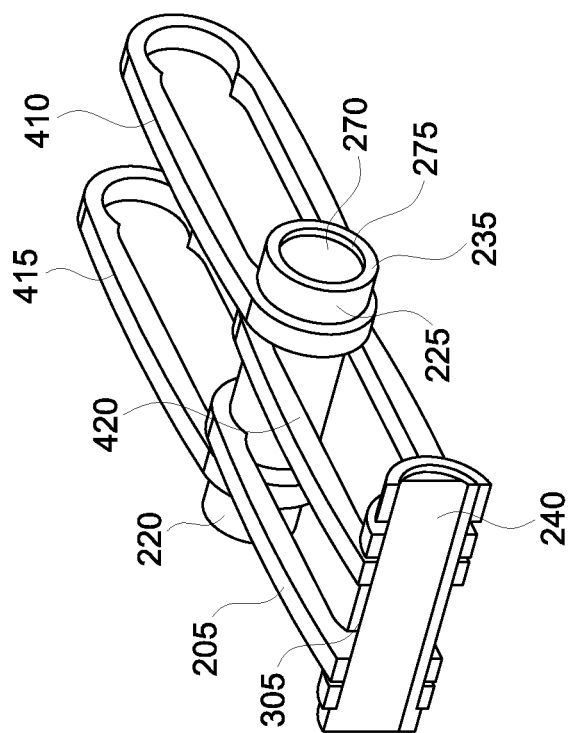
FIG. 10

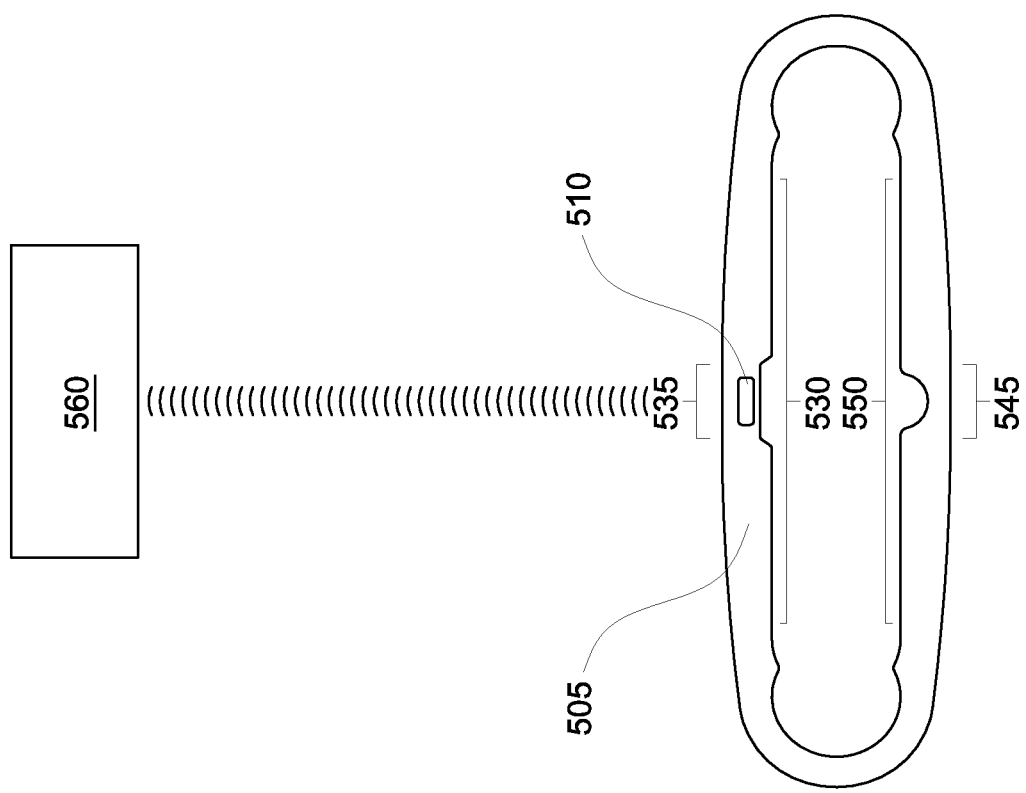

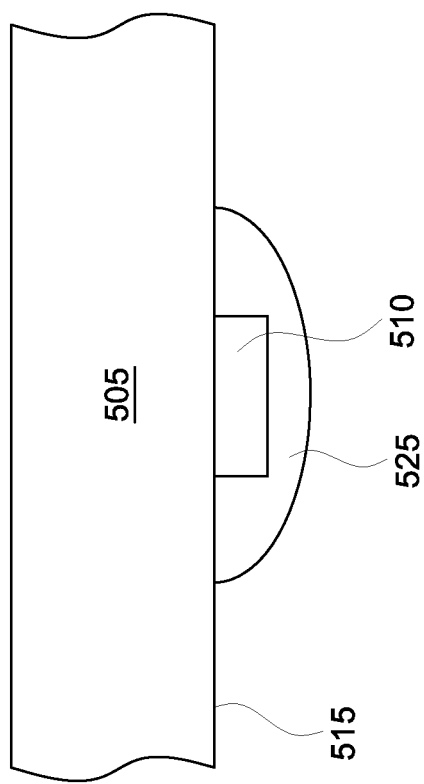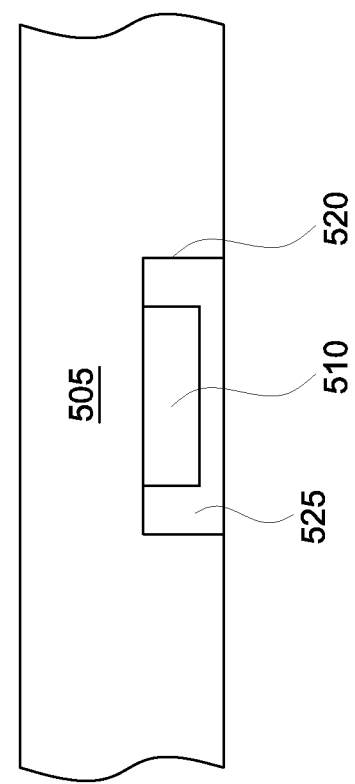

COMPOSITE LOOP CHAIN

RELATED APPLICATIONS

This application claims priority under 35 U.S.C. § 119(e) to U.S. Provisional Application Ser. No. 62/471,013, titled "COMPOSITE LOOP CHAIN WITH FEWER COMPONENTS," filed on Mar. 14, 2017, which is herein incorporated by reference in its entirety.

BACKGROUND

1. Field of Disclosure

Aspects and embodiments disclosed herein are directed generally to wastewater treatment systems which utilize settling basins and to apparatus and methods for operating settling basins.

2. Discussion of Related Art

Chain and scraper sludge collector equipment is designed to remove settled suspended solids (sludge) from rectangular settling basins, for example, rectangular concrete settling basins, in municipal and industrial water and wastewater treatment plants. In some implementations, rectangular settling basins may be from about 10 feet (3 meters) to about 30 feet (9.1 meters) wide, from about 50 feet (15.2 meters) to about 300 feet (91.4 meters) long, and from about eight feet (2.4 meters) to about 14 feet (4.3 meters) deep. Scraper flights are often used to scrape settled material on the basin floor to a sludge withdrawal location, for example, a hopper in the settling basin. Concurrently with the removal of sludge from the basin floor, other scraper flights may be utilized to push floating material, referred to generally as "scum," from the surface of liquid in the settling basin to a scum collector for removal.

The sludge and scum removal mechanism in a settling basin often includes two endless strands of chain that run the length of the settling basin. Scraper flights that span the width of the settling basin are mounted to the chain. The chain and the flights attached to the chain move through the settling basin to direct the sludge to the sludge withdrawal location in the floor at one end of the basin. The chain and flights are propelled by sprockets that are affixed to a headshaft that spans the width of the settling basin.

SUMMARY

In accordance with an aspect of the present disclosure there is provided a settling basin of a wastewater treatment system. The settling basin comprises a collector chain for driving a plurality of flights through the settling basin. The collector chain includes chain links comprising a plurality of side bars including an inner pair of side bars and an outer pair of side bars. Each of the plurality of side bars may be shaped as flattened open loops. The collector chain further includes stepped connecting pins configured to join the plurality of side bars. Each stepped connecting pin includes a first end including a head portion having a cross-sectional area larger than apertures defined by interior curved surfaces of end sections of the side bars through which the stepped connecting pin extends and a second end on an opposite end of the stepped connecting pin from the first end and having a cross-sectional area less than the cross-sectional area of the head portion. The collector chain further includes end caps configured to receive the second ends of the stepped connecting pins. Apertures configured to receive a retaining element are defined in the end caps and second ends of the stepped connecting pins.

In some embodiments, the end caps include internal bores configured to receive and retain the second ends of the stepped connecting pins.

In some embodiments, the end caps include reduced cross-sectional area portions and larger cross-sectional area portions having cross-sectional areas greater than cross-sectional areas of the reduced cross-sectional area portions. The end caps may further comprise grooves defined in the larger cross-sectional area portions of the end caps. The grooves may be configured to receive and retain ends of the retaining elements passing through the end caps. Each stepped connecting pins may further comprise a stepped portion having a cross-sectional area intermediate of the cross-sectional area of the head portion and the cross-sectional area of the non-stepped portion. The stepped portion may be configured to be disposed within the apertures of the plurality of side bars.

In some embodiments, each of the plurality of side bars includes inwardly extending projections that extend the interior curved surfaces of the end sections of the plurality of side bars beyond 180°. At least one of the stepped connecting pins and end caps may include one or more projections configured to engage the inwardly extending projections of the plurality of side bars and suppress relative motion between the stepped connecting pins, end caps, and outer pairs of side bars.

In some embodiments, the settling basin further comprises shields sized and shaped to align with sides of the plurality of side bars. The shields may be formed integral with one of the stepped connecting pins and end caps. The shields may comprise sheets that are retained on outer walls of the plurality of side bars. The shields may include apertures having recesses sized and shaped to receive radially extending projections disposed on one of the stepped connecting pins and end caps.

In some embodiments, at least one of the plurality of side bars includes a strain gauge. The at least one of the plurality of side bars may include a wireless transmitter configured to transmit data from the strain gauge to an external data recorder. The at least one of the plurality of side bars may further includes a memory configured to retain information related to time in service of the at least one of the plurality of side bars. The wireless transmitter may be configured to transmit the data related to time in service of the at least one of the plurality of side bars to the external data recorder. The external data recorder may be programmed to issue an alarm responsive the data related to time in service of the at least one of the plurality of side bars being indicative of the at least one of the plurality of side bars approaching or exceeding a rated useful life. The strain gauge and wireless transmitter may be potted with a water impermeable material at least one of on a surface of the at least one of the plurality of side bars or within a cavity defined in the at least one of the plurality of side bars. The external data recorder may be programmed to issue an alarm responsive to stress measured by the strain gauge exceeding a predefined level. The strain gauge and wireless transmitter may be disposed in a portion of a center section of the at least one of the plurality of side bars that is thinned relative to other portions of the center section. The at least one of the plurality of side bars may be formed of a different material than others of the plurality of side bars. The strain gauge may include one of an optical strain gauge and an acoustic strain gauge.

In some embodiments, the settling basin further comprises at least one sprocket including one of a strain gauge or pressure transducer configured to measure stress applied to the collector chain.

In some embodiments, at least one of the stepped connecting pins includes an internal core having a strain gauge configured to measure stress applied to the collector chain.

In accordance with another aspect, there is provided a collector chain for driving a plurality of flights through a settling basin of a wastewater treatment system. The collector chain includes chain links comprising a plurality of side bars including an inner pair of side bars and an outer pair of side bars. Each of the plurality of side bars may be shaped as flattened open loops. The collector chain further includes stepped connecting pins configured to join the plurality of side bars. Each stepped connection pins includes a first end including a head portion having a diameter larger than portions of the plurality of side bars through which the stepped connecting pin extends and a second end on an opposite end of the stepped connecting pins from the first end and having a diameter less than the diameter of the head portion. The collector chain includes end caps configured to receive the second ends of the stepped connecting pins and a strain gauge included in at least one of the plurality of side bars.

In accordance with another aspect, there is provided a method of operating a settling basin of a wastewater treatment system. The method comprises monitoring stress applied to a collector chain of the settling basin utilizing one of a strain gauge coupled to a chain link of the collector chain and a pressure transducer disposed in a sprocket of a chain drive system of the settling basin, and performing preventative maintenance on the settling basin responsive to the stress applied to the collector chain exceeding a predetermined value.

The method may further comprise receiving a wireless signal from the collector chain providing an indication of a time in service of the collector chain, and replacing at least a portion of the collector chain responsive to the indication of the time in service indicating that the at least a portion of the collector chain has reached or exceeded a rated useful lifetime.

In accordance with another aspect, there is provided a method of retrofitting a settling basin of a wastewater treatment system. The method comprising one or more of replacing one or more connector pins of links of a collector chain of the settling basin with one or more respective stepped connecting pins configured to join side bars of the links, each stepped connecting pins including a first end including a head portion having a cross-sectional area larger than portions of the side bars through which the stepped connecting pin extends, replacing end caps coupled to ends of one or more connector pins of the one or more links of the collector chain with end caps including a groove configured to receive an end of a fastener used to join the collector pins to the end caps and reduce a tendency of the end of the fastener to catch debris in wastewater in the settling basin, adding side shields to one or more side bars of one or more respective links of the collector chain, the one or more side shields covering an opening defined in sides of the one or more side bars, or replacing one or more side bars of one or more respective links of the collector chain with a respective one or more side bars including a strain gauge.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 5A is an isometric view of another chain link assembly that may be utilized in the wastewater treatment plant settling basin of FIG. 1;

FIG. 10 is a partial cross-sectional view of a chain link assembly without covers and a chain link assembly with covers installed;

FIG. 11 illustrates a sensor enabled side bar of a chain link assembly in communication with an external monitor/data recorder;

FIG. 12A illustrates a method of mounting a sensor on a wall of a side bar of a chain link assembly;

FIG. 12B illustrates a method of potting a sensor within a wall of a side bar of a chain link assembly;

DETAILED DESCRIPTION

Figure 1:
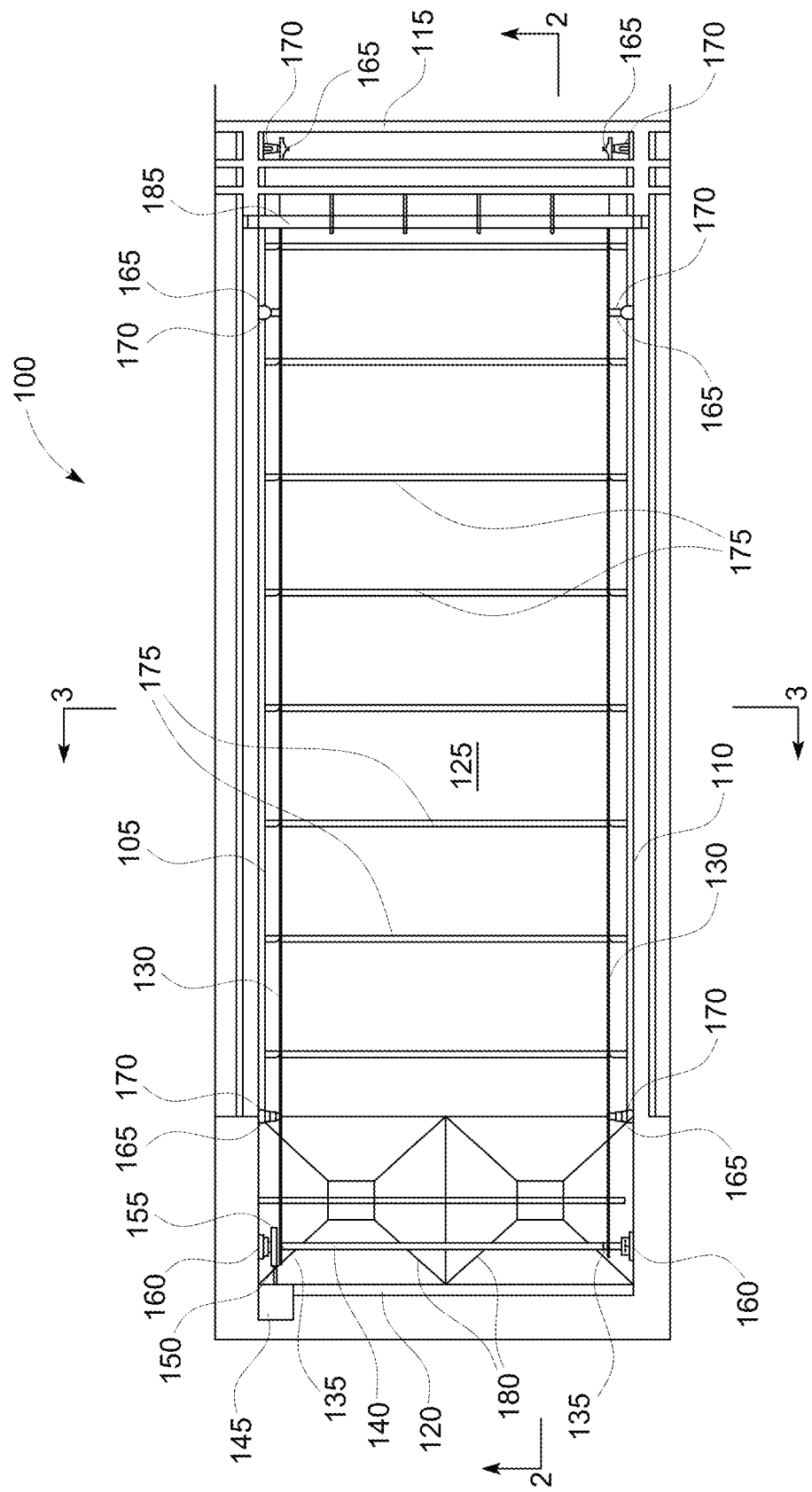
FIG. 1 is a plan view of an embodiment of a wastewater treatment plant settling basin.

Aspects and embodiments disclosed herein are not limited to the details of construction and the arrangement of components set forth in the following description or illustrated in the drawings. Aspects and embodiments disclosed herein are capable of other embodiments and of being practiced or of being carried out in various ways.

Collector chains utilized in settling basins of wastewaters treatment plants may be subjected to harsh conditions. The liquid in a settling basin may exhibit swings in pH and/or changes in temperature from day to night or from season to season. Collector chains are also subject to mechanical stresses and repetitive vibrational stress associated with being driven through the settling basin.

Collector chains for use in settling basins of wastewater treatment plants desirably exhibit a number of properties. The collector chains are advantageously lightweight to facilitate installation or replacement and to minimize power utilized to drive the collector chains and attached flights through the settling basins. A collector chain should be mechanically strong along its entire length to resist deformation due to stress associated with being driven through the settling basin. A collector chain is desirably corrosion resistant so that it is not affected by the environment in the settling basin nor does it affect the environment due to its presence there. A collector chain should have few parts to facilitate installation or replacement and to reduce a number of possible failure points. A collector chain should also be resistant to accumulation of debris, for example, fibrous matter or rags in a settling basin. Accumulation of such debris in the collector chain may increase drag on the chain as it is driven through the settling basin, thus increasing the power used to drive the chain though the settling basin. Accumulation of such debris in the collector chain may also interfere with the passage of the collector chain over sprockets in the settling basin, potentially increasing power consumption, stoppage of the collector chain, or damage to the collector chain or sprockets. Collector chains may desirably provide an indication of stress experienced by links of the collector chain as the collector chain is drawn through a settling basin to provide advance notice of potential problems and provide for preventative maintenance to be performed rather than repair upon failure of a component of the settling basin.

One possible material from which a collector chain may be formed is metal. Settling basin collector chains have typically been fabricated out of carbon steel or stainless steel. The weight of the metal collector chains, however, is often substantial, and a large amount of power may be utilized to drive metal collector chains through a settling basin. The weight of the metal collector chains often requires the use of strong and heavy sprockets and associated mounting equipment, which may result in a settling basin having a high capital cost. The weight of the metal collector chains often makes maintenance difficult when the metal collector chains are to be removed and/or replaced. When carbon steel is used, corrosion can be a problem since the metal collector chains are normally not painted or otherwise treated for corrosion protection. If a corrosion resistant metal collector chain is desired, the collector chain may be constructed from stainless steel. The use of stainless steel, however, is costly due to the expense of the material and the difficulty of machining stainless steel as compared to carbon steel.

Another material from which a collector chain may be formed is engineering plastic (hereinafter, referred to as "plastic"). Plastics are typically corrosion resistant and generally lighter than most metals. Further, plastic collector chains can be either machined or molded, which reduces the cost of construction as compared to conventional steel collector chains. Most plastics, however, do not possess the mechanical strength desirable in a settling basin collector chain. A plastic collector chain may deform over time due to forces associated with driving the collector chain and flights through a settling basin.

Collector chains may be formed of ceramic materials. Ceramics are typically corrosion resistant and strong. Ceramics, however, typically have poor impact resistance and may shatter when experiencing a sharp force or crack after being subjected to repetitive vibrational stress.

Composite materials, for example, fiber reinforced plastics or metals embedded with ceramic materials may be strong, impact resistant, corrosion resistant, and lightweight. Many composite materials may be molded, which reduces the cost of construction as compared to conventional steel collector chains which may require machining. One drawback of many composite collector chains, however, is their cost relative to collector chains formed of common metals, for example, carbon steel or many plastics. Some forms of composite, however, are not excessively expensive and may provide an acceptable tradeoff between cost and mechanical properties desirable in a collector chain that may be superior to those of pure metal, plastic, or ceramic materials.

Aspects and embodiments disclosed herein involve utilizing a collector chain formed of a composite material (a "composite collector chain") in designs of chain and scraper sludge collector equipment in wastewater treatment plant settling basins instead of a conventional solid steel collector chain. The composite material may be a polymer matrix composite, for example, a nylon or epoxy matrix composite, a metal matrix composite, for example an aluminum or steel matrix composite, or a ceramic matrix composite, for example, a glass or alumina matrix composite. The composite material may include fibers, for example, glass, metal, carbon, aramid, or boron fibers embedded in the matrix. The composite material may include particles, for example, metal, polymer, or ceramic particles embedded in the matrix. In some embodiments, the composite is filament wound fiberglass reinforced plastic (FRP).

Aspects and embodiments disclosed herein may include a chain-drive assembly for use in a settling basin at least partially filled with wastewater. A chain-drive assembly disposed in the settling basin may include a parallel composite collector chains carrying flights and extending along both the bottom of the settling basin to remove settled sludge and at the surface of wastewater in the settling basin to collect and remove surface scum. The collector chains may include features to reduce the potential for the accumulation of debris in or in the links of the collector chains as compared to prior designs. The collector chains may include features to provide an indication of stress applied to links of the collector chains as they travel through the settling basin.

Other portions of the chain and scraper sludge collector equipment, for example, the headshaft, the flights, the bull sprocket, collector headshaft sprockets, idler sprockets, sprocket key elements, and/or wall bearings or stub posts may be formed of metal, for example, steel. In other embodiments any one or more of these portions of the chain and scraper sludge collector equipment may be formed of a polymer or a composite material, similar to that from which one or more portions of the collector chain may be formed.

Illustrated in FIG. 1 is a rectangular settling basin 100 which may be utilized in a wastewater treatment plant for the settling and removal of suspended solids from wastewater undergoing treatment. The settling basin 100 includes an opposed pair of sidewalls 105, 110, a pair of end walls 115, 120, and a bottom surface 125. A pair of parallel collector chains 130 are driven by a headshaft 140. The collector chains 130 engage the headshaft through collector headshaft sprockets 135 secured to the headshaft 140 proximate opposite ends of headshaft 140. The collector chains 130 may also engage idler sprockets 165 which may rotate freely in wall bearings or about stub posts 170 secured to the sidewalls 105, 110 of the settling basin 100.

A motor, for example, an electric motor 145 external to the settling basin 100 drives a drive chain 150 which engages a bull sprocket 155 secured to the headshaft 140 proximate an end thereof to rotate the headshaft 140. The headshaft 140 is supported by and rotates about headshaft mounts, for example, stub posts 160 secured to the sidewalls 105, 110 of the settling basin 100.

A series of sludge and scum collector flights 175 are connected at opposite ends to the collector chains 130. In operation, the flights 175 collect sludge from the bottom surface 125 of the settling basin 100 and direct it into sludge hoppers 180 for removal. The flights 175 also skim the top surface of liquid in the settling basin and direct floating scum into a scum collector, for example, a scum pipe assembly 185.

Figure 2:
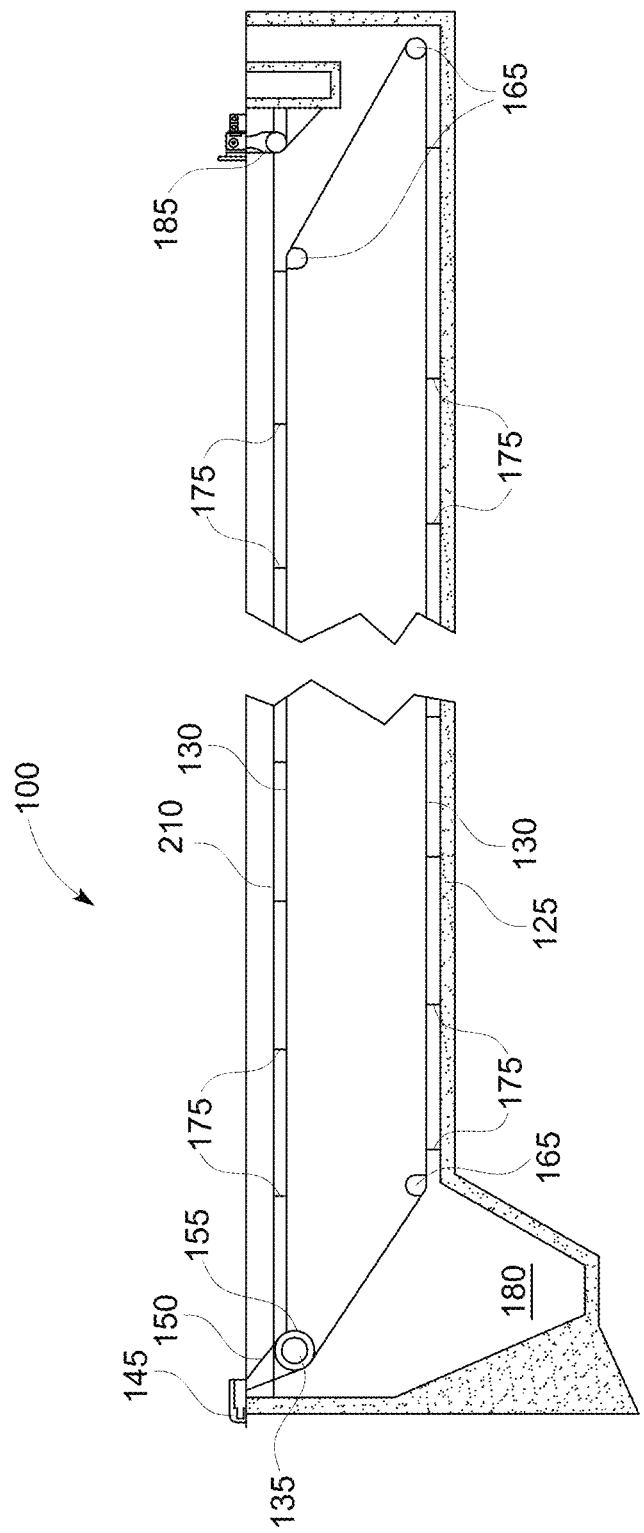
FIG. 2 is a cross sectional broken view of the settling basin of FIG. 1 along line 2-2 of FIG. 1.

The settling basin 100 is illustrated in cross section along line 2-2 of FIG. 1 in FIG. 2. The collector chain 130, as illustrated in FIG. 2, travels in a clockwise direction about the collector headshaft sprocket 135 and idler sprockets 165. The flights 175 both scrape settled sludge (not shown) from the bottom surface 125 of the settling basin 100 into the sludge hopper 180 and skim scum (not shown) from the surface 210 of liquid in the settling basin 100 and direct it to the scum pipe assembly 185.

Figure 3:
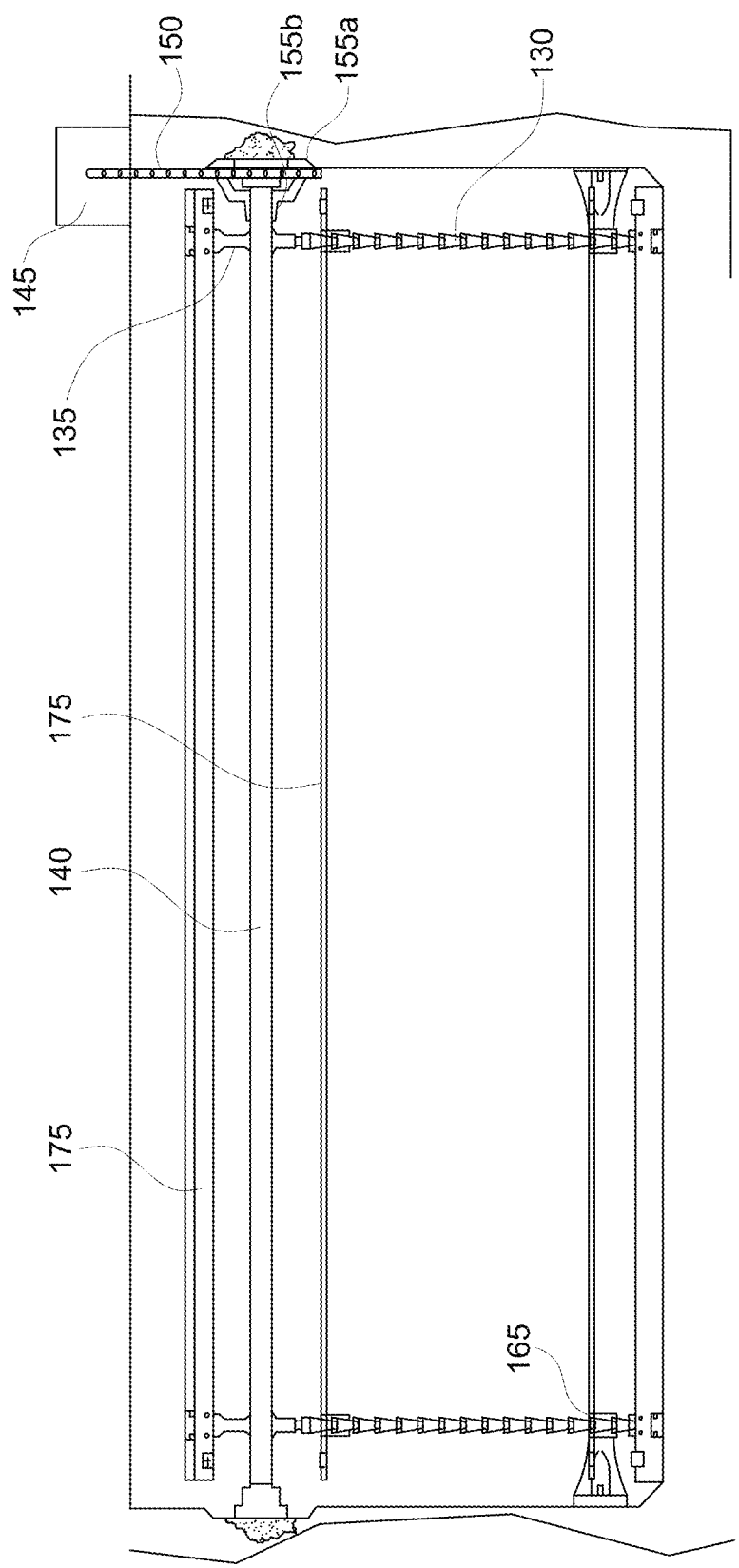
FIG. 3 is another cross sectional view of the settling basin of FIG. 1 along line 3-3 of FIG. 1.

The settling basin 100 is illustrated in cross section along line 3-3 of FIG. 1 in FIG. 3. In FIG. 3 the drive chain 150 can be seen engaging the bull sprocket 155 secured to the headshaft 140. In the embodiment illustrated in FIG. 3, the bull sprocket 155 is configured with an external tooth section 155a which engages the drive chain 150 that is horizontally displaced toward a wall of the settling basin 100 from a base portion 155b where it is connected to the headshaft 140.

Figure 4:
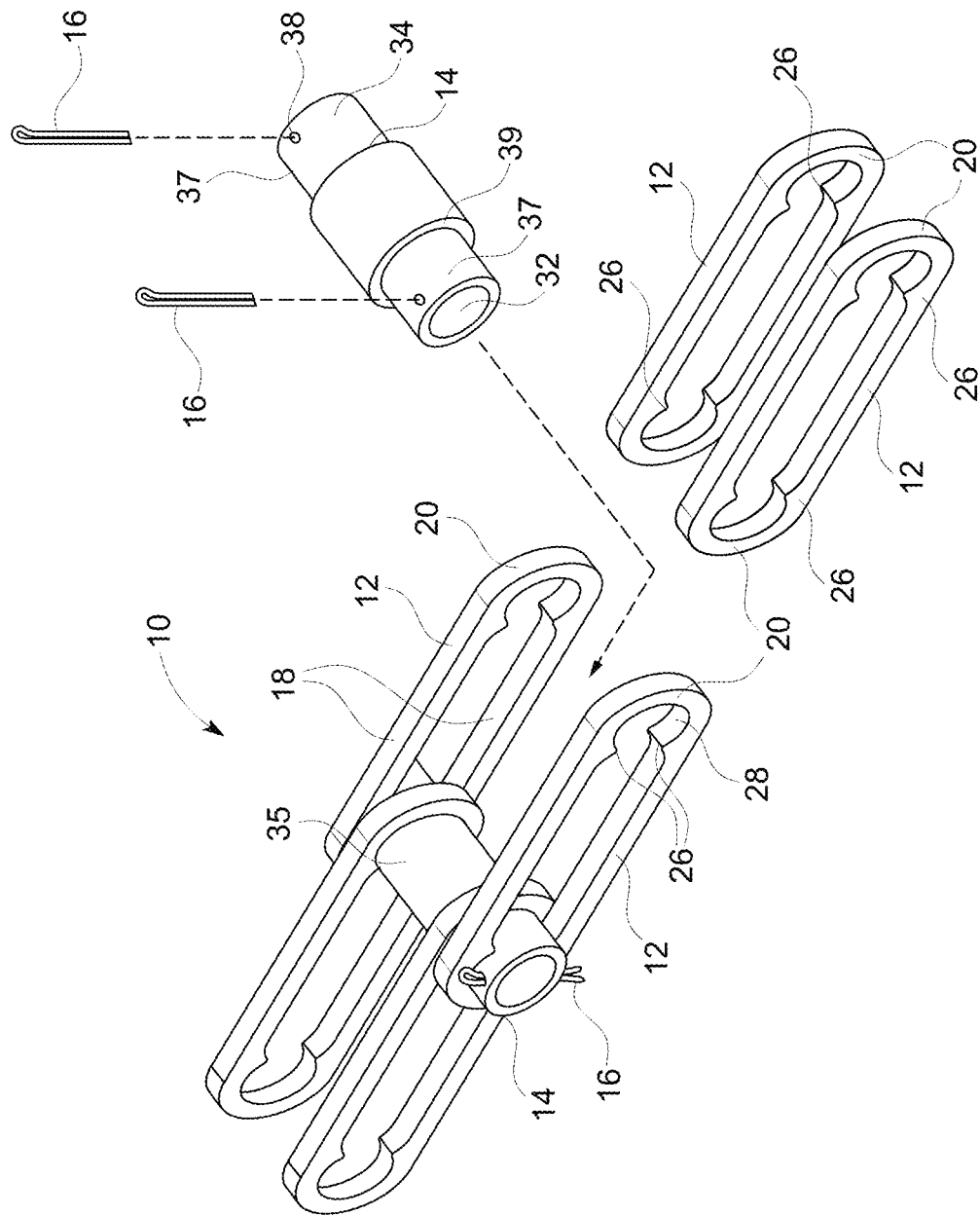
FIG. 4 is a partially exploded isometric view of a chain link assembly that may be utilized in the wastewater treatment plant settling basin of FIG. 1.

An example of a collector chain 130 that may be utilized in the settling basin 100 is described in U.S. Pat. No. 4,863,418 (the '418 patent), which is incorporated by reference herein in its entirety. An illustration of a chain link assembly of the example collector chain presented in the '418 patent is reproduced FIG. 4 generally at 10. The chain link assembly 10 includes two identical side bars 12 each having the shape of a flattened open loop with a pair of straight and parallel center sections 18 integrally connected by curved end sections 20. The side bars 12 are joined by a connecting pin 14 and are retained on the connecting pin 14 by cotter pins 16 extending through each end of the connecting pin 14.

Each side bar 12 is formed of a hardened resin matrix of, for example, a thermosetting polyester or epoxy resin. The matrix material is reinforced by high tensile strength, continuous filaments, for example, glass, steel, carbon, or aramid filaments which have been wound in parallel paths around the loop.

The side bars 12 include integral, inwardly extending projections 26 of hardened resin which extend the interior curved surface 28 of the end sections 20 to a circular arc greater than 180°. These projections 26 serve to locate and maintain the end of the pin 14 longitudinally and concentrically at the ends of the side bars 12.

The connecting pin 14 consists of a cylindrical core 32 having a polymeric sleeve 34 and a pair of drilled holes 38 at its ends for receiving cotter pins 16. The core 32 is preferably a composite of a hardened thermoset resin reinforced by high strength filamentary material extending in the direction of the longitudinal axis of the core. The pin 14 also includes a sleeve 34 comprised of a low friction plastic material, which surrounds the core 32 to form a wear resistant coating or sleeve around the core.

The sleeve 34 includes an integral central barrel portion 35 adapted to engage the sprocket teeth, the central barrel portion of the sleeve having a material thickness greater than the material thickness of the opposite ends 37 of the sleeve, and the opposite ends 39 of the central portion 35 of the sleeve define shoulders adapted to be engaged by the sides of an inner pair of side bars 12, the shoulders 39 and barrel portion 35 maintaining the side bars 12 in spaced apart relation The '418 patent discloses that embodiments of the disclosed collector chain of comparable size and similar geometry to prior art chains has been shown to have an ultimate strength of nearly 40,000 lbs. (18,144 kg.) and is expected to have a working rating of 6000 lbs. force (26,689 Newtons), which is greater than that of cast iron chains.

Various improvements may be made to the collector chain disclosed in the '418 patent. It has been discovered that it may be possible to reduce the number of individual parts forming a collector chain as compared to that disclosed in the '418 patent, which may have about 24 parts per foot (about 79 parts per meter) of chain. It has also been discovered that the exposed cotter pins and the open loops of the side bars of the collector chain disclosed in the '418 patent may undesirably tend to snag or collect debris such as rags or other fibrous debris when traveling through a settling basin. This collected debris may stress the links of the collector chain as it moves through a settling basin and may eventually cause a chain link to fail. The repair costs associated with such failures are significant, sometimes about $50,000 or more due to the need to drain and sanitize the settling basin prior to performing repairs.

Figure 5B:
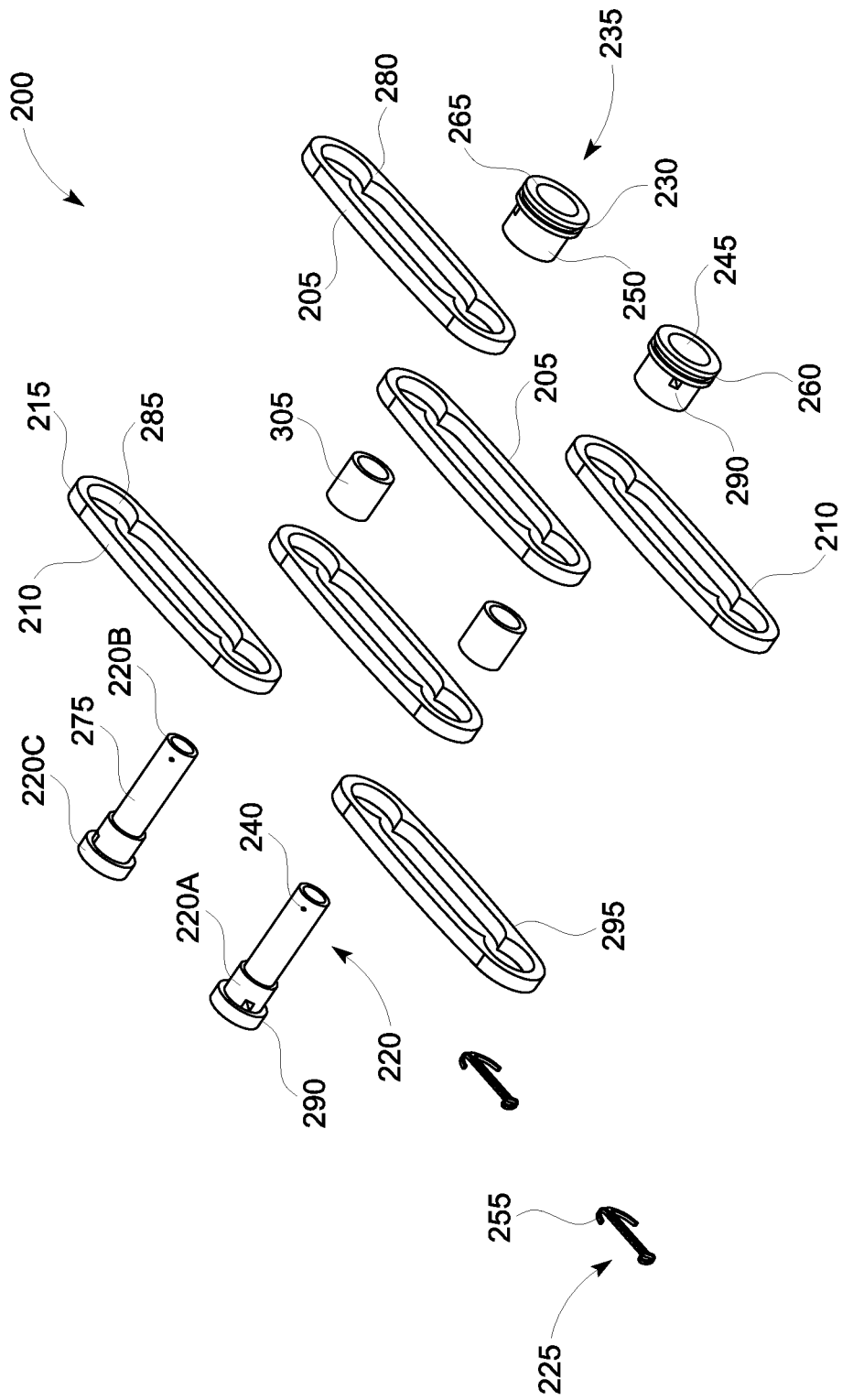
FIG. 5B is an exploded view of the chain link assembly of FIG. 5A.
Figure 6:
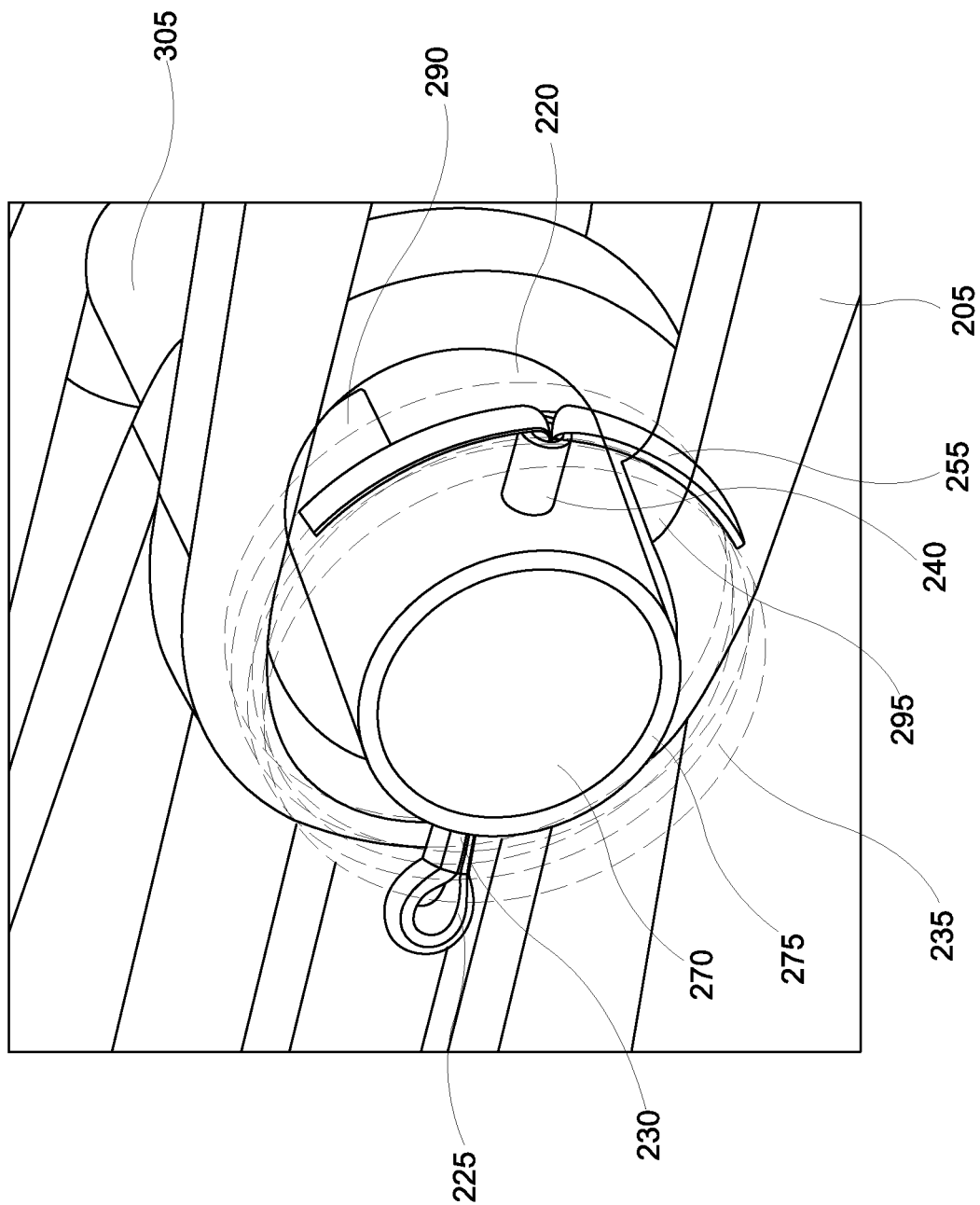
FIG. 6 is an enlarged view of a portion of the chain link assembly of FIG. 5A illustrating an end cap in phantom.

One example of an improved chain link assembly for a settling basin collector chain is illustrated generally at 200 in perspective view in FIG. 5A and in an exploded view in FIG. 5B. The chain link assembly 200 includes side bars 205 having the shape of a flattened open loop with a pair of straight and parallel center sections 210 integrally connected by curved end sections 215. The side bars 205 are joined by stepped connecting pins 220. The stepped connecting pins 220 differ from the connecting pins 14 described in the '418 patent in that retaining elements, for example, cotter pins 225 are utilized only on one side of the stepped connecting pins 220. The stepped connecting pins 220 include stepped portions 220A, non-stepped portions 220B, and a head 220C. The heads 220C have a greater external diameter or cross-sectional area than the stepped portions 220A. The stepped portions 220A have a greater external diameter or cross-sectional area than the non-stepped portions 220B. The cotter pins 225 pass through apertures 230 defined in end caps 235 that connect to the non-stepped portions 220B of the stepped connecting pins 220 and through corresponding passageways 240 defined in the non-stepped portions 220B of the stepped connecting pins 220 proximate terminal ends thereof (FIG. 6).

The non-stepped portions 220B of the stepped connecting pins 220 may be disposed within central bores 245 of reduced diameter or reduced cross-sectional area portions 250 of the end caps 235 or central bores 245 passing through an entirety of the end caps 235. The reduced diameter or cross-sectional area portions 250 of the end caps 235 may have the same or substantially the same diameter or cross-sectional area as the non-stepped portions 220B of the stepped connecting pins 220. In other embodiments, the end caps 235 may extend into recesses or bores defined in the non-stepped portions 220B of the stepped connecting pins 220.

Lower portions 255 of the cotter pins 225 are bent into an arc-shaped configuration after the cotter pins 225 are inserted through the end caps 235 and stepped connecting pins 220. The arc-shaped lower portions 255 of the cotter pins 225 fit into grooves 260 defined in the surface of a larger diameter or cross-sectional area portion 265 (larger in diameter or cross-sectional area than the reduced diameter or cross-sectional area portions 250) of the end caps 235. The lower portions 255 of the cotter pins 225 have a reduced tendency to snag on rags or other debris than standard cotter pins because by being disposed in the grooves 260 rather than protruding from a side of the end caps 235, the grooves 260 prevent the ends of the cotter pins 225 from snagging debris in wastewater in the settling basin.

It should be appreciated that although the stepped connecting pins 220, end caps 235, and portions of each are illustrated as being cylindrical or having circular cross-sections, it should appreciated that one or more portions of either the connecting pins 220 or end caps 235 may have non-circular cross-sections, for example, triangular, square, pentagonal, hexagonal, or oval cross sections, or cross-sections having any other appropriate geometrical shape.

Each side bar 205 is formed of a hardened resin matrix of, for example, a thermosetting polyester or epoxy resin. The matrix material is reinforced by high tensile strength, continuous filaments, for example, glass, steel, carbon, or KEVLAR® para-aramid synthetic fibers which have been wound in parallel paths around the loops of the side bars 205.

The stepped connecting pins 220 may include a core 270 formed of hardened resin matrix of, for example, a thermosetting polyester or epoxy resin reinforced by high tensile strength, continuous filaments, for example, glass, steel, carbon, or KEVLAR® para-aramid synthetic fibers. The core 270 of the stepped connecting pins 220 may be formed by a pultrusion process wherein reinforcing filaments coated with resin are pulled through a die, causing the reinforcing filaments to be aligned in mutually parallel relation and causing the filaments to be compressed together to form a densified core material.

The stepped connecting pins 220 may include a sleeve 275 surrounding the core 270. The sleeve 275 may be formed of nylon or another self-lubricating polymeric material. In other embodiments, the sleeve 275 may be formed of non-corroding metallic materials such as 304SS, 316SS, Nitronic 60, Duplex or Super-duplex stainless steels or a polymer coated metal. The sleeve 275 may optionally be reinforced with high tensile strength, continuous or short, discrete filaments, for example, glass, steel, carbon, or KEVLAR® para-aramid synthetic fibers.

The side bars 205 include integral, inwardly extending projections 280 of hardened resin which extend the interior curved surface 285 of the end sections 215 to a circular arc greater than 180°. These projections 280 serve to locate and maintain the non-stepped portions 220B of the stepped connecting pins 220 and the end caps 235 longitudinally and concentrically at the ends of the side bars 205. The heads of the stepped connecting pins 220 have a larger diameter or cross sectional area than that of the aperture defined by the interior curved surfaces 285 of the end sections 215 of the side bars 205 and so are prevented from passing through the end sections 215 of the side bars 205 without the need for cotter pins or other fasteners or retaining elements.

Both the stepped portions 220A of the stepped connecting pins 220 and the end caps 235 may include one or more, for example, two or four outwardly extending projections or tabs 290 that engage internal sides 295 of the inwardly extending projections 280 (see FIG. 6) in the outside side bars 205 (the side bars 205 between which are sandwiched other side bars 205) to prevent or suppress relative motion between the stepped connecting pins 220, the end caps 235, and the outside side bars 205. In non-limiting examples, center lines of the tabs may be offset by about 92° about the circumferences of the stepped portions 220A of the stepped connecting pins 220 or endcaps 235. In other embodiments, the projections or tabs may engage corresponding recesses in the outside side bars 205 to prevent or suppress relative motion between the stepped connecting pins 220, the end caps 235, and the outside side bars 205. The lack of relative motion between the stepped connecting pins 220, the end caps 235, and the outside side bars 205 prevents wear on the outer surfaces of the stepped connecting pins 220 and end caps 235, and on the interior curved surfaces 285 of the outside side bars 205. The inside side bars 205 that are sandwiched between the outer side bars 205 are free to rotate about the stepped connecting pins 220 and end caps 235 relative to the outer side bars 205 to allow the collector chain to curve around sprockets in a settling basin.

Rollers 305 may be provided about the stepped connecting pins 220 between the inner side bars 205. The rollers 305 may be free to rotate about the surface of the connecting pins 220 between the inner side bars 205. The rollers 305 may be formed of a hard, corrosion resistant material, for example, stainless steel to prevent or reduce wear on the connecting pins 220 due to contact with sprockets in a settling basin. In other embodiments, the rollers 305 may be formed of a low friction material, for example, nylon, fiber reinforced nylon, or KEVLAR® para-aramid synthetic fibers.

Embodiments of the improved chain link assembly may include 16 parts per foot (53 parts per meter) for embodiments in which the side bars 205 have 8 inch (20.3 cm) total lengths as compared to 24 parts per foot (about 79 parts per meter) of chain as in some prior known settling basin collector chain designs. In a non-limiting example of a settling basin collector chain 200, the side bars 205 have 8 inch (20.3 cm) total lengths with a 6 inch (15.2 cm) center-to-center distance between adjacent stepped connecting pins 220 and heights of 2 inches (5.1 cm). The stepped connecting pins 220 may have overall lengths of about 4.1 inches (10.4 cm) with the stepped portions 220A having lengths of about 0.86 inches (2.2 cm) and diameters of about 1.36 inches (3.45 cm), the non-stepped portions 220B having lengths of about 2.72 inches (6.9 cm), external diameters of about 1.12 inches (2.8 cm) and internal diameters of about 1 inch (2.54 cm), the head 220C having a length of about 0.5 inches (1.3 cm) and a diameter of about 1.75 inches (4.4 cm), and the tabs 290 having lengths of about 0.35 inches (0.9 cm) and heights of about 0.06 inches (0.15 cm). The end caps 235 may have overall lengths of about 1.36 inches (3.45 cm) with the reduced diameter portions 250 having lengths of about 0.86 inches (2.2 cm), outer diameters of about 1.36 inches (3.45 cm), and inner diameters of about 1.15 inches (2.9 cm) and the larger diameter portions 265 having lengths of about 0.5 inches (1.3 cm) and diameters of about 1.75 inches (4.4 cm).

Figure 7A:
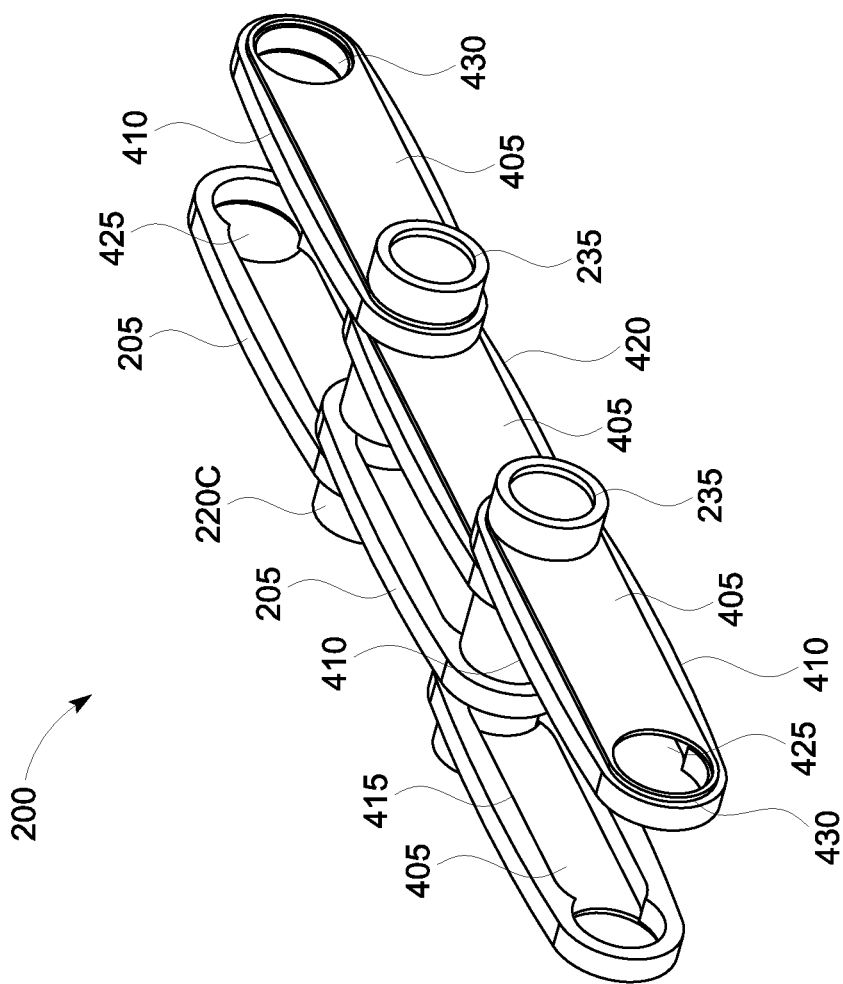
FIG. 7A is an isometric view of a chain link assembly including side covers that may be utilized in the wastewater treatment plant settling basin of FIG. 1.
Figure 7B:
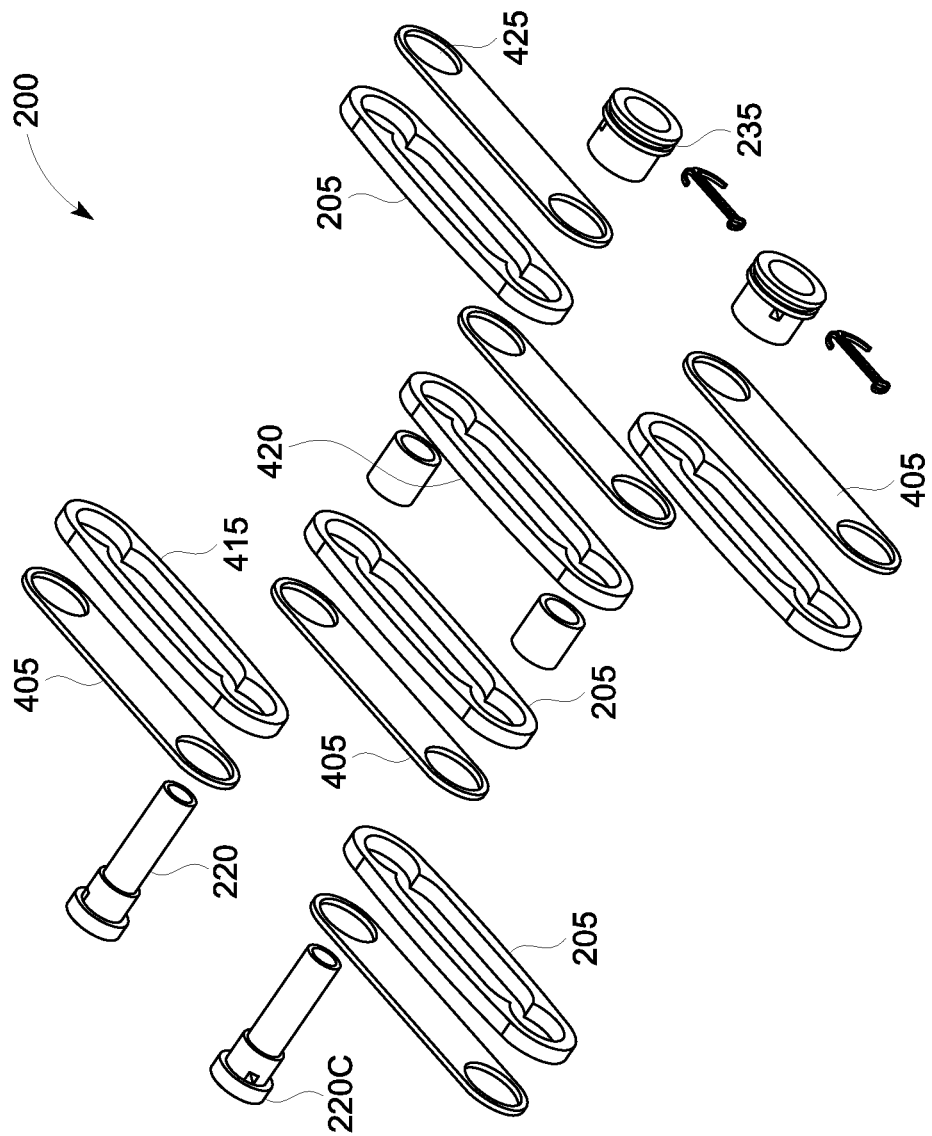
FIG. 7B is an exploded view of the chain link assembly of FIG. 7A.

In some embodiments, the settling basin collector chain 200 may include shield elements to help prevent debris from being caught within the open loops of the individual side bars 205. The shield elements may be in the form of sheets of material. An example of settling basin collector chain 200 including shield elements is illustrated in perspective view in FIG. 7A and in an exploded view in FIG. 7B. As illustrated in FIGS. 7A and 7B the shield elements may include or consist of covers 405 sized and shaped to align with sides of the side bars 205 and block the open space within the open loops of the individual side bars 205. The covers 405 may be disposed on outer sidewalls of the individual side bars 205. The covers 405 may be held in place on the outer side bars 205 on one side of the collector chain 200 between the heads 220C of the stepped connecting pins 220 and outer sidewalls 410 of the outer side bars 205 and on the outer side bars 205 on the other side of the collector chain 200 between the end caps 235 and outer sidewalls 410 of the outer side bars 205. The covers 405 on the outside of the inner side bars 205 may be sandwiched between inner walls 415 of the outer side bars 205 and outer walls 420 of the inner side bars 205.

The covers 405 may include apertures 425 to receive the stepped portions 220A of the stepped connecting pins 220 or the reduced diameter portions 250 of the end caps 235. The apertures 425 of the covers 405 may include recesses 430 sized and shaped to receive the projections or tabs 290 of the stepped connecting pins 220 and end caps 235.

The covers 405 may be formed of a polymeric material, for example, polytetrafluoroethylene (PTFE), nylon, or another suitable polymer.

In some embodiments, as illustrated in FIGS. 7A and 7B, covers 405 are distinct or formed separately from other portions of the collector chain. In other embodiments, the covers 405 may be formed integral with one or more of the side bars 205, stepped connecting pins 205, or end caps 235.

Figure 8:
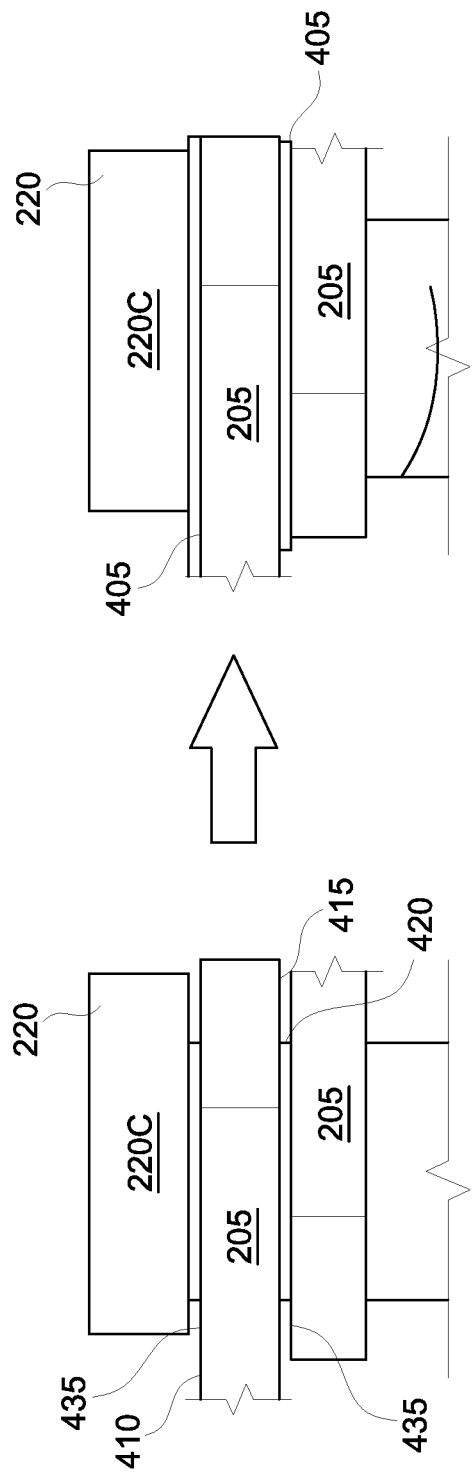
FIG. 8 is a comparison between a portion of the chain link assembly of FIG. 7A including the covers and without the covers installed.
Figure 9:
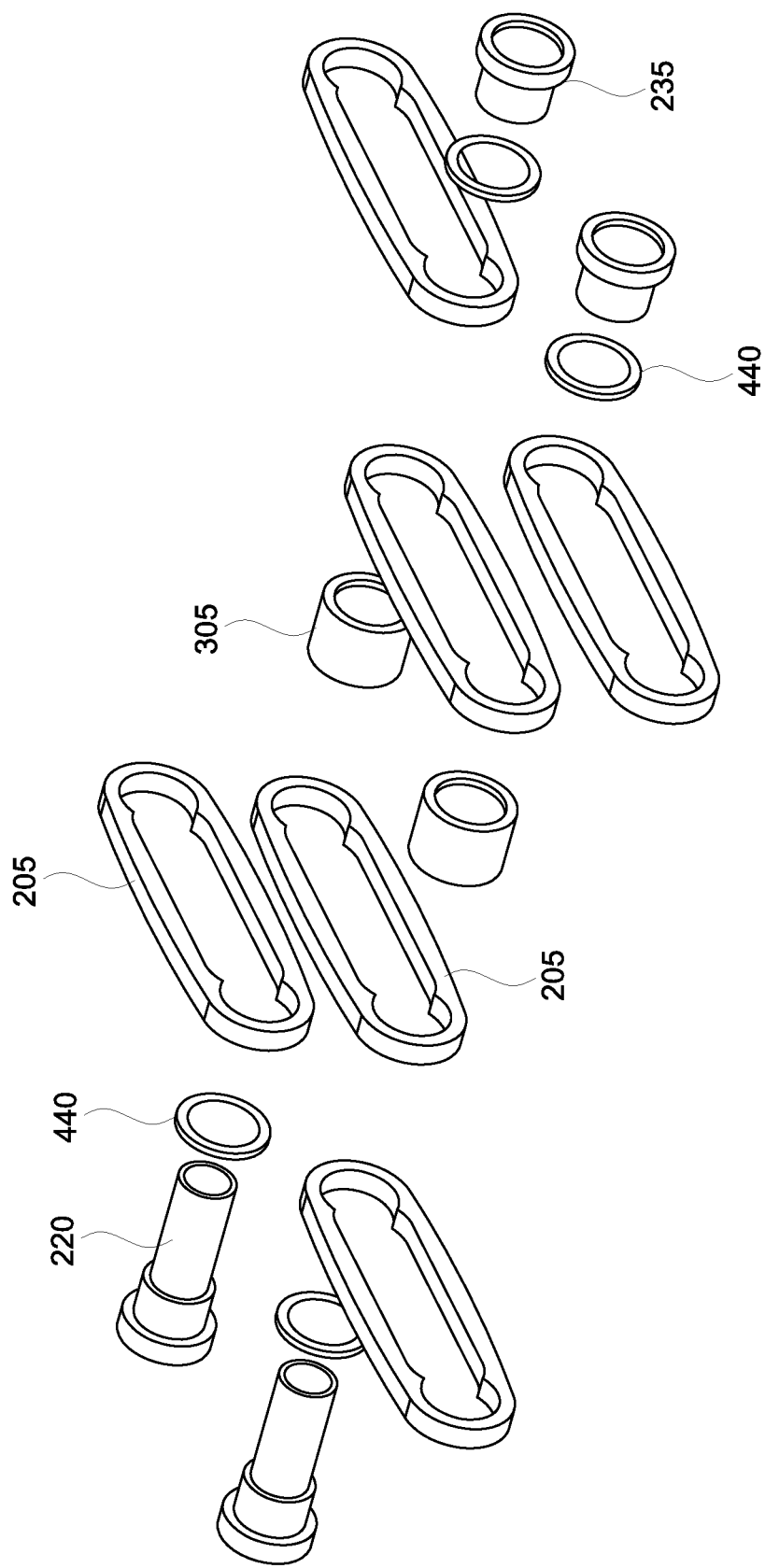
FIG. 9 is an exploded view of the chain link assembly of FIG. 7A with the covers replaced by washers.
Figure 13:
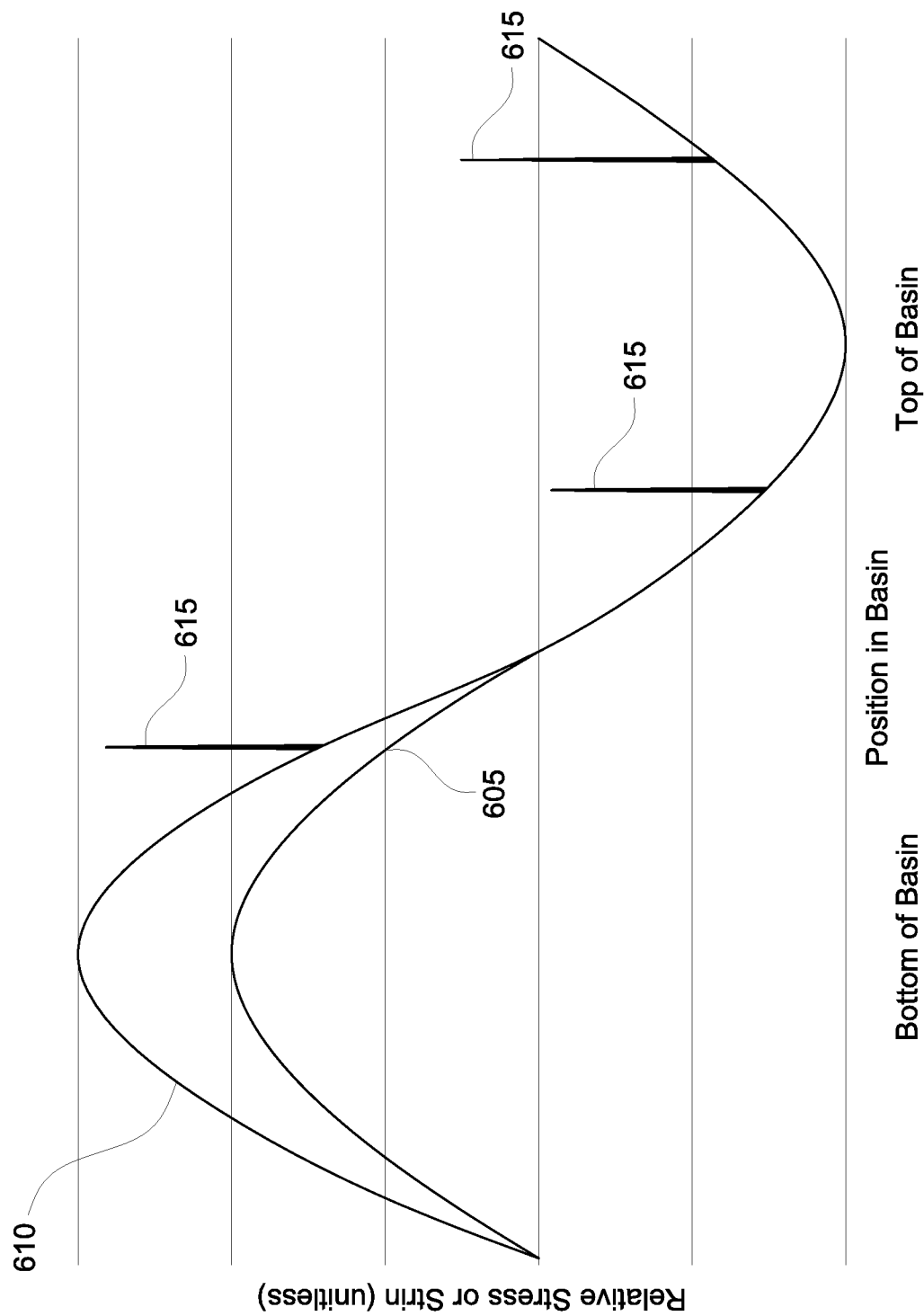
FIG. 13 illustrates a prophetic chart of stress data obtainable from a sensor enabled side bar of a chain link assembly.

In some embodiments, the components of the settling basin collector chain 200 may be configured to provide a customer with a choice of whether or not to install covers 405 on faces of the side bars 205. As illustrated in FIG. 8, one or more components of the settling basin collector chain 200, for example, the connecting pins 220 may be sized to provide gaps 435 between the heads 220C of the connecting pins 220 and the outer sidewalls 410 of the outer side bars 205 and/or between the inner walls 415 of the outer side bars 205 and outer walls 420 of the inner side bars 205. The gaps 435 are sized to accommodate the covers 405 if one desires to include the covers in the settling basin collector chain 200. The covers 405 may be between about 0.03 inches (0.8 mm) and about 1/16 of an inch (1.6 mm) thick, and the gaps may be similarly sized. If one were to choose not to include the covers 405 in a portion or all of the settling basin collector chain 200, washers 440, illustrated in FIG. 9, may be inserted between the heads 220C of the connecting pins 220 and the outer sidewalls 410 of the outer side bars 205 and/or between the inner walls 415 of the outer side bars 205 and outer walls 420 of the inner side bars 205 to fill the space that would otherwise be present due to the gaps 435.

A comparison between settling basin collector chains 200 with and without covers 405 are illustrated in partial cross-section in FIG. 10.

In some embodiments, one or more components of a settling basin collector chain 200 or other components of a collector chain drive system for a settling basin may include one or more sensors to provide an indication of one or more conditions within the settling basin. The one or more conditions may include, for example, stress or strain on the collector chain 200 that may be indicative of an undesirable or unusual situation. The undesirable or unusual situation may be a different (greater or lesser) than expected stress or stain being applied to the collector chain 200 or to sprockets in the collector chain 200 drive and support system of the settling basin. An observation of a stress or strain applied to the collector chain 200 or to sprockets that is different than expected may be indicative of a different amount of sludge present in the settling basin than expected or may be indicative of interference with the collector chain 200 drive and support system due to, for example, debris being caught in the collector chain 200. An indication of the undesirable or unusual situation may provide for an operator of the settling basin to investigate the settling basin for a potential cause of the undesirable or unusual situation and make adjustments or perform preemptive repairs or preventative maintenance to avoid failure of the collector chain 200, collector chain drive system or sprockets, or other portion of the settling basin.

In one embodiment, illustrated in FIG. 11, a sensor/transmitter 510 may be installed in or mounted to a portion of one or more side bars 505 of a settling basin collector chain 200. The sensor/transmitter 510 may be a strain gauge sensor including wireless data transmission capabilities and an internal battery. The sensor/transmitter 510 may be mounted on a sidewall 515 of the side bar 505 as illustrated in FIG. 12A or embedded in a cavity 520 defined in the side bar 505 as illustrated in FIG. 12B. A potting material 525 that is water impermeable and resistant or inert with respect to the liquid in the settling basin, for example, an epoxy or other suitable potting material may be disposed about the sensor/transmitter 505 to protect it from damage due to contact with the liquid in the settling basin. The sensor/transmitter 510 may be disposed in a portion 535 of the center section 530 of the side bar 505 that is thinned relative to other portions of the center section 530 but which is thick enough to carry the rated working load of the side bar 505. The thinned portion 535 may deform under stress to a greater extent than the remainder of the center section 530 of the side bar 505 and thus provide for greater sensitivity of the sensor/transmitter 510 than if it were disposed on a non-thinned portion of the side bar. A corresponding thinned portion 545 having a thickness T may be defined on the opposite center section arm 550 of the side bar 505 so that the side bar 505 deforms evenly under applied stress and does not cause misalignment with adjacent side bars under applied stress.

The sensor/transmitter 510 may communicate via the Bluetooth wireless technology standard, Zigbee, Wi-Fi or any other desired standard or protocol to a monitor/data recorder 560 external to the settling basin. In some embodiments, the sensor/transmitter 510 may include one of the nBlue™ nano ampere network modules available from BlueRadios Inc. to provide wireless data transmission to the monitor/data recorder 560. The sensor/transmitter 510 may transmit to the monitor/data recorder 560 continuously, or in other embodiments, on a periodic basis, for example, once every 10 minutes, once every 30 minutes, or at a different periodicity to preserve battery life. The sensor/transmitter 510 may include a memory, for example, RAM or flash memory to record a pattern of stress or strain over time to transmit to the monitor/data recorder 560 on a periodic basis and/or when the monitor/data recorder 560 requests data regarding the pattern of stress or strain over time or an instantaneous stress or strain measurement from the sensor/transmitter 510.

The sensor/transmitter 510 may provide an indication of strain exerted on the side bar 505 to the monitor/data recorder 560 as it travels through the settling basin. Strain exerted on the side bar 505 may be observed to increase as the side bar 505 and associated flights, for example, flights 175 as illustrated in the settling basin 100 of FIGS. 1-3 pass though sludge on the floor of the settling basin and may be observed to decrease as the side bar 505 and associated flights 175 exit the sludge bed and move toward the top of the basin or surface of fluid in the basin.

A pattern of stress (or strain) verses time and/or positon of the side bar 505 and associated flights 175 in the settling basin may be collected over time and a mathematical model or an expected pattern of stress (or strain) verses time and/or positon of the side bar 505 and associated flights 175 in the settling basin may be developed by the monitor/data recorder 560. An observation by the monitor/data recorder 560 of stress in the side bar 505 exceeding a predefined level or of a deviation from the mathematical model or pattern by more than a desired amount may cause the monitor/data recorder 560 to issue an alarm to an operator of the settling basin 100. A deviation resulting in the alarm may be, for example, a strain 10%, 20%, 25%, 50%, or 75% or more different (greater or less) than expected for a particular time and/or position of the side bar 505 and associated flights 175 in the settling basin or a deviation that violates a set of statistical process control rules established for the mathematical model or pattern of expected strain (or stress). For example, a pattern of stress (or strain) versus time and/or positon of the side bar 505 and associated flights 175 in the settling basin under normal operating conditions may exhibit the pattern illustrated in FIG. 12 at 605. If the observed pattern of stress changed to exhibit the pattern indicated at 610, an alarm may be issued by the monitor/data recorder 560 that the sludge bed in the settling basin 100 may be thicker or deeper than expected. Spikes 615 in the stress pattern may be indicative of a link in the settling basin collector chain 200 carrying debris that interferes with the passage of the link over a sprocket of the settling basin. Observation of such spikes 615 may cause the monitor/data recorder 560 to issue an alarm that there may be an issue with one or more links of the settling basin collector chain 200.

In other embodiments, the memory of the sensor/transmitter 510 may include information identifying the particular side bar 505 to which it is coupled. The sensor/transmitter 510 may transmit the identifying information along with any stress or strain data to the monitor/data recorder 560 so the monitor/data recorder 560 can determine from which side bar 505 the data transmission originated. Additionally or alternatively, the memory of the sensor/transmitter 510 may include information regarding a manufacturing date of the side bar 505 or when the side bar 505 or collector chain 200 including the side bar 505 was put into service. The side bar 505 or collector chain 200 may have a rated useful life. The sensor/transmitter 510 may transmit the data regarding the age or time in service of the side bar 505 and/or collector chain 200 to the monitor/data recorder 560 on a periodic basis or when such information is requested by the monitor/data recorder 560. The monitor/data recorder 560 may issue an alert or alarm to an operator of the settling basin responsive to the data regarding the age or time in service of the side bar 505 and/or collector chain 200 being indicative of the side bar 505 and/or collector chain 200 nearing, reaching, or exceeding its rated useful life. The operator may thus be informed that the side bar 505 and/or collector chain 200 may need to be replaced and the operator may perform preventative maintenance to replace the side bar 505 and/or collector chain 200 prior to failure of same.

In some embodiments, the side bar 505 including the sensor/transmitter 510 may be placed in a link of a collector chain 200 in parallel with a side bar 505 that is substantially similarly or identically shaped and formed of the same material or materials so that both side bars 505 exhibit the same degree of strain in response to an applied stress to keep the collector chain 200 straight and the sides of the collector chain 200 aligned.

The side bar 505 including the sensor/transmitter 510 may be formed of the same or similar materials as the other side bars of the collector chain 200 (e.g., side bars 205 as described above). In other embodiments, however, the side bar 505 including the sensor/transmitter 510 may be formed of a different material or materials as the other side bars of the collector chain 200. Different side bars formed of fiber reinforced polymer may exhibit different stress/strain behavior due to variability inherent in the manufacturing process. It may thus be desirable to form a side bar 505 including the sensor/transmitter 510 of a material that has less variability in stress/strain behavior from one side bar to another. Such a material may include, for example, stainless steel. One particular grade of stainless steel that may be utilized for the body of side bar 505 including the sensor/transmitter 510 may be 17-4 stainless steel.

Figure 14:
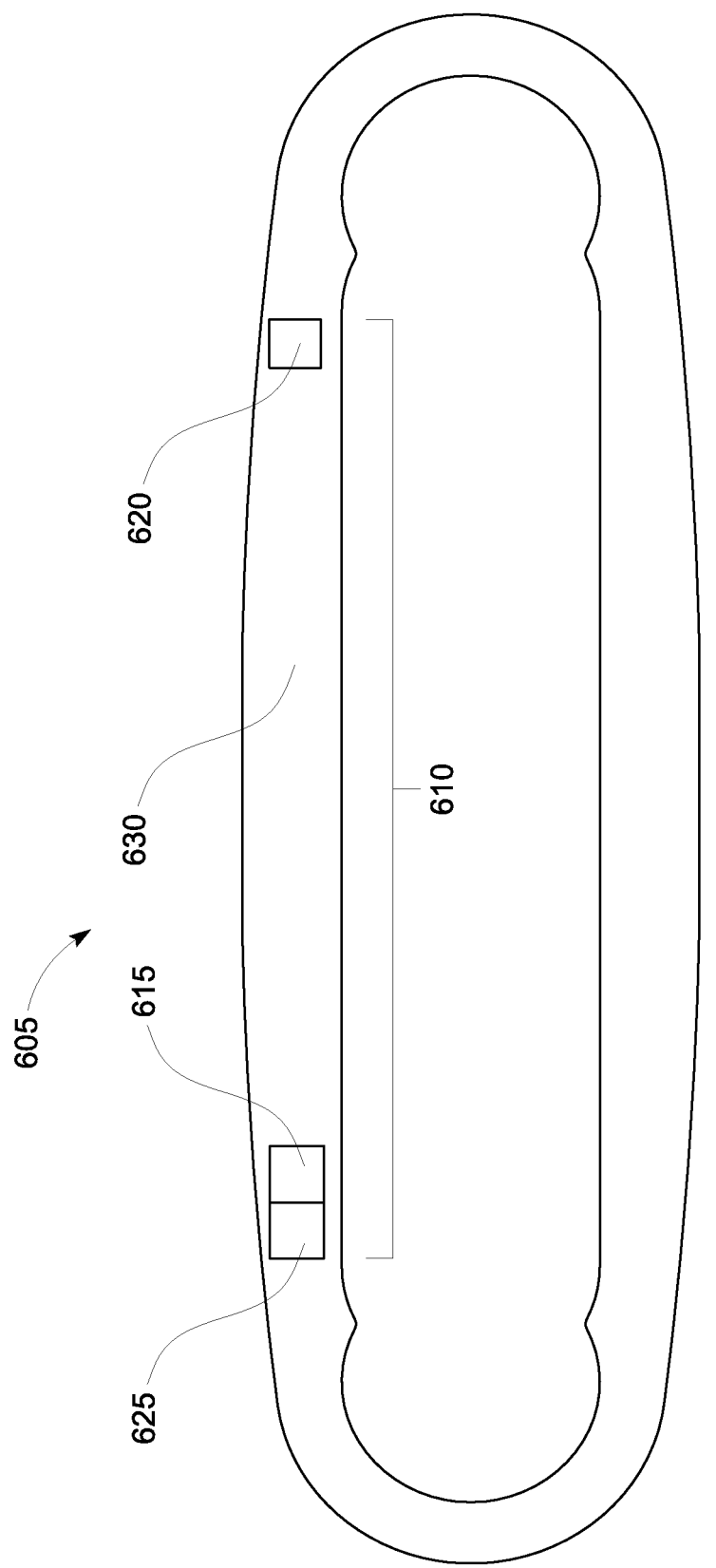
FIG. 14 illustrates an alternate embodiment of a sensor enabled side bar of a chain link assembly.

The sensor/transmitter 510 included in the side bar 505 may be any of various commonly available electromechanical, semiconductor, or microelectromechanical system (MEMS) strain gauges. One non-limiting example of a strain gauge that may be used for the sensor/transmitter 510 is the T24-SA wireless strain gauge available from Metrolog. In other embodiments, the sensor/transmitter 510 may be an optical or acoustic strain gauge. As illustrated in FIG. 14 an embodiment of a side bar, indicated at 605 may include a strain sensor system 610 including an optical or acoustic (e.g., ultrasound) transmitter or transceiver 615 and an associated receiver or reflector 620. The strain senor system 610 may also include a wireless transmitter 625 as described above with reference to the sensor/transmitter 510. Strain induced in the side bar 605 will be reflected in a change of length of the side bar 605 which may cause a change in distance between the transmitter or transceiver 615 and associated receiver or reflector 620. This change in distance may be recorded by the strain senor system 610 and transmitted to a monitor/data recorder such as monitor/data recorder 560 described above.

In other embodiments, the transmitter or transceiver 615 may emit an acoustic signal into the body of the side bar 605 itself. The time the acoustic signal takes to reach the receiver or reflector 620 or to return to the transmitter or transceiver 615 though the body 630 of the side bar 605 may be dependent on the strain placed on the side bar. Data regarding the time of travel of the acoustic signal may be provided to the monitor/data recorder 560 via the wireless transmitter 620 and the monitor/data recorder 560 may derive the stress applied to the side bar 605 from this data.

Embodiments of the sensor/transmitter 510 or strain senor system 610 may be included in multiple side bars 505, 605 in a collector chain 200 of a settling basin 100 to provide simultaneous data from multiple areas with the settling basin 100.

Figure 15:
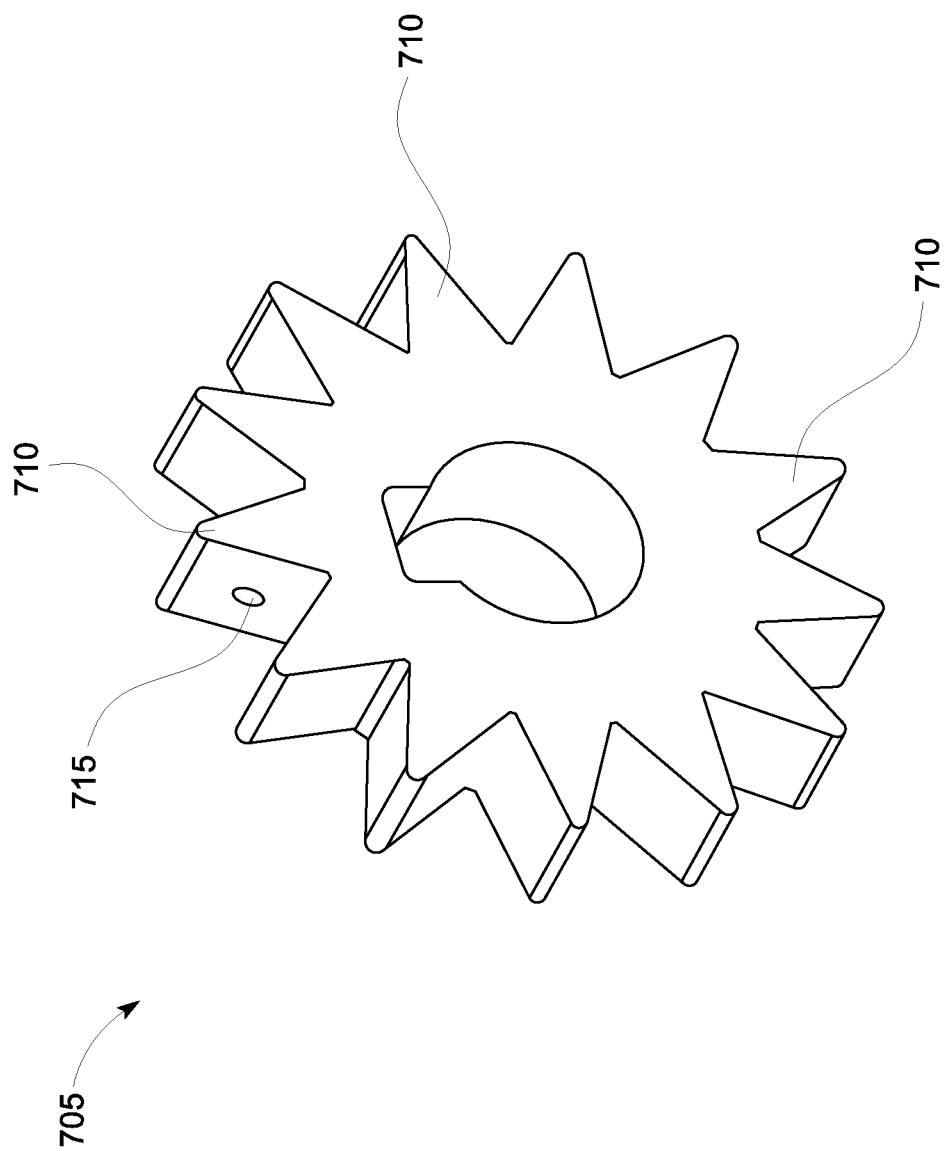
FIG. 15 illustrates a sensor enabled sprocket of a wastewater treatment plant settling basin.

One or more sensors may also or alternatively be included in one or more portions of a collector chain drive system of a settling basin 100 other than a side bar 505, 605. As illustrated in FIG. 15 a strain gauge or pressure transducer, wireless transmitter, and battery, (and optionally, a memory element, for example, RAM or flash memory) collectively indicated at 715 may be included in one or more teeth 710 of at least one sprocket 705 of a collector chain drive system of a settling basin 100. The sensor/transmitter 715 may be potted in a tooth 710 of a sprocket 705 in a similar manner as the sensor/transmitter 510 is potted in the side bar 505 as illustrated in FIG. 12B to protect the sensor/transmitter 715 from moisture or other contaminants.

The sprocket 705 may be a collector headshaft sprocket 135, idler sprockets 165, or a drive sprocket included in or coupled to the electric motor 145 in a settling basin 100 such as that described with reference to FIGS. 1-3.

The sensor/transmitter 715 may provide an indication of stress applied by the collector chain 200 or individual links thereof to the sprocket 705 and/or to each individual one of the teeth 710 including a sensor/transmitter 715. The sensor/transmitter 715 or sensor/transmitters 715 may measure and provide an indication of stress exerted on the collector chain 200 as a whole to a monitor/data recorder 560 and/or may provide stress data for individual links of the collector chain 200 to the monitor/data recorder 560. The sensor/transmitter 715 may also send information identifying the sprocket 705 and/or age or time in service of the sprocket 705 to the monitor/data recorder 560 in a similar manner as described above with reference to the sensor/transmitter 510 of the side bar 505.

Communications between the sensor/transmitters 715 and the monitor/data recorder 560 may be performed similarly as described above with reference to the sensor/transmitter 510.

The monitor/data recorder 560 may determine global conditions within the settling basin 100, for example, an amount of sludge present in the settling basin 100 from data received from the sensor/transmitter 715 or sensor/transmitters 715. The monitor/data recorder 560 may also or alternatively determine conditions specific to individual links or sections of the collector chain 200, for example, whether a portion or link of the collector chain 200 may have debris caught in itself from data received from the sensor/transmitter 715 or sensor/transmitters 715. The sprocket 705 may be formed of a material with a low degree in variation in stress/strain behavior from one unit to the next, for example, stainless steel.

Figure 16:
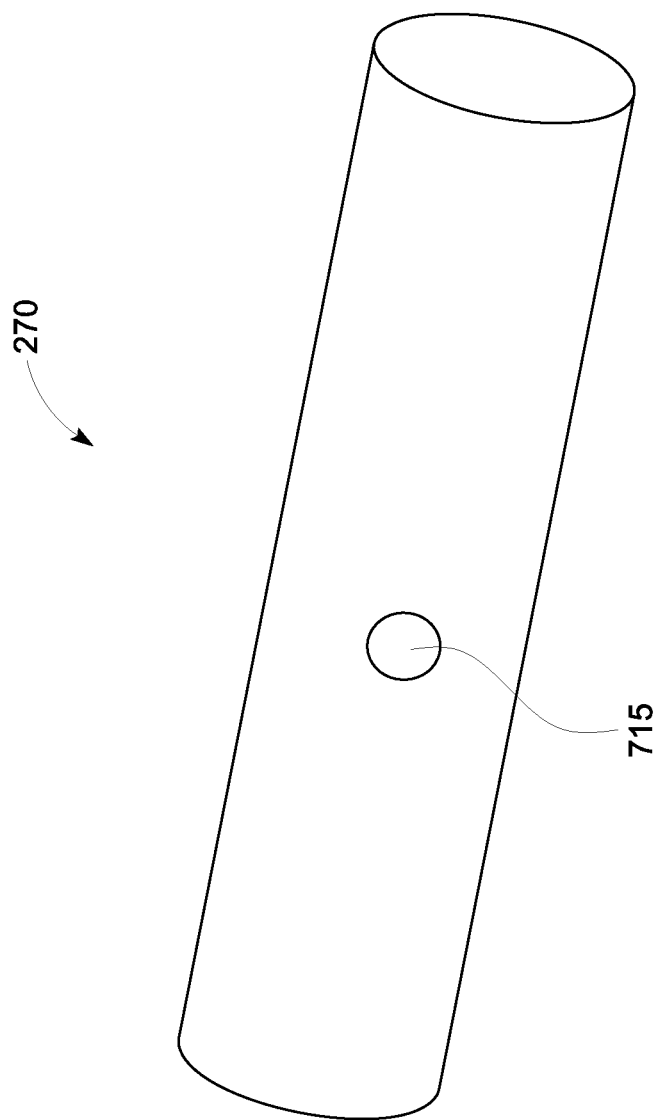
FIG. 16 illustrates a sensor enabled core of a connecting pin of a chain link assembly.

In a further embodiment, a sensor/transmitter 715 as disclosed with reference to the sprocket 705 may be included in an embodiment of a connecting pin 220 of a collector chain 200 or in the core 270 of one or more connecting pins 220 of a collector chain 200 as illustrated in FIG. 16. The sensor/transmitter 715 included in the core 270 of the one or more connecting pins 220 may provide similar data as described above with reference to the sensor/transmitter 510 of the side bar 505. The core 270 may be formed of a material with a low degree in variation in stress/strain behavior from one unit to the next, for example, stainless steel.

In another aspect of the present disclosure, it is to be understood that an existing settling basin 100 may be retrofit to include any of the embodiments of the collector chain side bars or other portions of the collector chain drive system described herein.

Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the disclosure. For example, although aspects of the present disclosure are described as used to remove biological floc from wastewater, these aspects may be equally applicable to the removal of any form of suspended solids, for example, inorganic suspended solids or fats, oil, or grease in a settling unit or vessel. Aspects of the wastewater treatment systems described herein may also use non-biological treatment methods rather than biological treatment methods for the treatment of wastewater. Accordingly, the foregoing description and drawings are by way of example only.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A settling basin of a wastewater treatment system, the settling basin comprising:
    a collector chain for driving a plurality of flights through the settling basin, the collector chain including chain links comprising:
        a plurality of side bars including an inner pair of side bars and an outer pair of side bars, each of the plurality of side bars shaped as flattened open loops;
        stepped connecting pins configured to join the plurality of side bars, each stepped connecting pin including a first end including a head portion having a cross-sectional area larger than apertures defined by interior curved surfaces of end sections of the side bars through which the stepped connecting pins extends and a second end on an opposite end of the stepped connecting pin from the first end and having a cross-sectional area less than the cross-sectional area of the head portion;
        end caps configured to receive the second ends of the stepped connecting pins, the end caps including reduced cross-sectional area portions and larger cross-sectional area portions having cross-sectional areas greater than cross-sectional areas of the reduced cross-sectional area portions; and
        apertures defined in the end caps and second ends of the stepped connecting pins configured to receive a retaining element.

2. The settling basin of claim 1, wherein the end caps include internal bores configured to receive and retain the second ends of the stepped connecting pins.

3. The settling basin of claim 1, further comprising grooves defined in the larger cross-sectional area portions of the end caps, the grooves configured to receive and retain ends of the retaining elements passing through the end caps.

4. The settling basin of claim 1, wherein each stepped connecting pin further comprises a stepped portion having a cross-sectional area intermediate of the cross-sectional area of the head portion and the cross-sectional area of the non-stepped portion, the stepped portion configured to be disposed within the apertures of the plurality of side bars.

5. The settling basin of claim 1, wherein each of the plurality of side bars includes inwardly extending projections that extend the interior curved surfaces of the end sections of the plurality of side bars beyond 180°.

6. The settling basin of claim 5, wherein at least one of the stepped connecting pins and end caps include one or more projections configured to engage the inwardly extending projections of the plurality of side bars and suppress relative motion between the stepped connecting pins, end caps, and outer pairs of side bars.

7. The settling basin of claim 1, further comprising shields sized and shaped to align with sides of the plurality of side bars.

8. The settling basin of claim 7, wherein the shields are formed integral with one of the stepped connecting pins and end caps.

9. The settling basin of claim 7, wherein the shields comprise sheets that are retained on outer walls of the plurality of side bars.

10. The settling basin of claim 7, wherein the shields include apertures having recesses sized and shaped to receive radially extending projections disposed on one of the stepped connecting pins and end caps.

11. The settling basin of claim 1, wherein at least one of the plurality of side bars includes a strain gauge.

12. The settling basin of claim 11, wherein the at least one of the plurality of side bars includes a wireless transmitter configured to transmit data from the strain gauge to an external data recorder.

13. The settling basin of claim 12, wherein the at least one of the plurality of side bars further includes a memory configured to retain information related to time in service of the at least one of the plurality of side bars and the wireless transmitter is configured to transmit the data related to time in service of the at least one of the plurality of side bars to the external data recorder.

14. The settling basin of claim 13, wherein the external data recorder is programmed to issue an alarm responsive the data related to time in service of the at least one of the plurality of side bars being indicative of the at least one of the plurality of side bars approaching or exceeding a rated useful life.

15. The settling basin of claim 12, wherein the strain gauge and wireless transmitter are potted with a water impermeable material at least one of on a surface of the at least one of the plurality of side bars or within a cavity defined in the at least one of the plurality of side bars.

16. The settling basin of claim 12, wherein the external data recorder is programmed to issue an alarm responsive to stress measured by the strain gauge exceeding a predefined level.

17. The settling basin of claim 12, wherein the strain gauge and wireless transmitter are disposed in a portion of a center section of the at least one of the plurality of side bars that is thinned relative to other portions of the center section.

18. The settling basin of claim 11, wherein the at least one of the plurality of side bars is formed of a different material than others of the plurality of side bars.

19. The settling basin of claim 11, wherein the strain gauge includes one of an optical strain gauge and an acoustic strain gauge.

20. The settling basin of claim 1, further comprising at least one sprocket including one of a strain gauge or pressure transducer configured to measure stress applied to the collector chain.

21. The settling basin of claim 1, wherein at least one of the stepped connecting pins includes an internal core having a strain gauge configured to measure stress applied to the collector chain.

22. A collector chain for driving a plurality of flights through a settling basin of a wastewater treatment system, the collector chain including chain links comprising:
a plurality of side bars including an inner pair of side bars and an outer pair of side bars, each of the plurality of side bars shaped as flattened open loops;
stepped connecting pins configured to join the plurality of side bars, each stepped connection pin including a first end including a head portion having a diameter larger than portions of the plurality of side bars through which the stepped connecting pin extends and a second end on an opposite end of the stepped connecting pin from the first end and having a diameter less than the diameter of the head portion;
end caps configured to receive the second ends of the stepped connecting pins, the end caps including reduced cross-sectional area portions and larger cross-sectional area portions having cross-sectional areas greater than cross-sectional areas of the reduced cross-sectional area portions; and
a strain gauge included in at least one of the plurality of side bars.

23. A settling basin of a wastewater treatment system, the settling basin comprising:
a collector chain for driving a plurality of flights through the settling basin, the collector chain including chain links comprising:
a plurality of side bars including an inner pair of side bars and an outer pair of side bars, each of the plurality of side bars shaped as flattened open loops;
shields sized and shaped to align with sides of the plurality of side bars;
stepped connecting pins configured to join the plurality of side bars, each stepped connecting pin including a first end including a head portion having a cross-sectional area larger than apertures defined by interior curved surfaces of end sections of the side bars through which the stepped connecting pins extends and a second end on an opposite end of the stepped connecting pin from the first end and having a cross-sectional area less than the cross-sectional area of the head portion;
end caps configured to receive the second ends of the stepped connecting pins; and
apertures defined in the end caps and second ends of the stepped connecting pins configured to receive a retaining element.

* * * * *